(12) United States Patent
Roschin et al.

(10) Patent No.: US 11,751,974 B2
(45) Date of Patent: Sep. 12, 2023

(54) AUTOMATIC ECTOPIC TEETH DETECTION ON SCAN

(71) Applicant: Align Technology, Inc., San Jose, CA (US)

(72) Inventors: Roman A. Roschin, Moscow (RU); Evgenii Vladimirovich Karnygin, Moscow (RU); Sergey Grebenkin, Moscow (RU); Alexey Lazarev, Moscow (RU); Dmitry Guskov, Moscow (RU); Ivan Slepynin, Moscow (RU); Alexey Vladykin, Balashikha (RU); Alexander Vovchenko, Moscow (RU); Alexander Beliaev, Moscow (RU)

(73) Assignee: Align Technology, Inc., San Jose, CA (US)

(*) Notice: Subject to any disclaimer, the term of this patent is extended or adjusted under 35 U.S.C. 154(b) by 27 days.

(21) Appl. No.: 17/450,541

(22) Filed: Oct. 11, 2021

(65) Prior Publication Data
US 2022/0023004 A1    Jan. 27, 2022

Related U.S. Application Data

(63) Continuation of application No. 16/407,087, filed on May 8, 2019, now Pat. No. 11,154,381.

(60) Provisional application No. 62/668,693, filed on May 8, 2018.

(51) Int. Cl.
*A61C 7/00* (2006.01)
*A61C 9/00* (2006.01)
*G06T 7/00* (2017.01)

(52) U.S. Cl.
CPC ............ *A61C 7/002* (2013.01); *A61C 9/0053* (2013.01); *A61C 9/0046* (2013.01); *G06T 7/0014* (2013.01)

(58) Field of Classification Search
None
See application file for complete search history.

(56) References Cited

U.S. PATENT DOCUMENTS

| | | |
|---|---|---|
| 6,227,850 B1 | 5/2001 | Chishti et al. |
| 6,227,851 B1 | 5/2001 | Chishti et al. |
| 6,299,440 B1 | 10/2001 | Phan et al. |
| 6,318,994 B1 | 11/2001 | Chishti et al. |
| 6,371,761 B1 | 4/2002 | Cheang et al. |
| 6,386,878 B1 | 5/2002 | Pavlovskaia et al. |
| 6,406,292 B1 | 6/2002 | Chishti et al. |
| 6,409,504 B1 | 6/2002 | Jones et al. |
| 6,457,972 B1 | 10/2002 | Chishti et al. |
| 6,488,499 B1 | 12/2002 | Miller |
| 6,514,074 B1 | 2/2003 | Chishti et al. |
| 6,554,611 B2 | 4/2003 | Chishti et al. |
| 6,582,229 B1 | 6/2003 | Miller et al. |
| 6,602,070 B2 | 8/2003 | Miller et al. |
| 6,621,491 B1 | 9/2003 | Baumrind et al. |
| 6,688,886 B2 | 2/2004 | Hughes et al. |

(Continued)

*Primary Examiner* — Leon Viet Q Nguyen
(74) *Attorney, Agent, or Firm* — Shay Glenn LLP

(57) ABSTRACT

Provided herein are orthodontic devices and methods for patients with missing or ectopic teeth. Methods and processes are provided to properly number the teeth of a patient's arch after a dental scan. Methods and processes are also provided to automatically detect missing or ectopic teeth after a dental scan. Methods of designing and manufacturing the aligner are also provided.

22 Claims, 20 Drawing Sheets

(56) References Cited

U.S. PATENT DOCUMENTS

| | | |
|---|---|---|
| 6,726,478 B1 | 4/2004 | Isiderio et al. |
| 6,729,876 B2 | 5/2004 | Chishti et al. |
| 6,739,869 B1 | 5/2004 | Taub et al. |
| 6,767,208 B2 | 7/2004 | Kaza |
| 6,783,360 B2 | 8/2004 | Chishti |
| 7,040,896 B2 | 5/2006 | Pavlovskaia et al. |
| 7,063,532 B1 | 6/2006 | Jones et al. |
| 7,074,038 B1 | 7/2006 | Miller |
| 7,074,039 B2 | 7/2006 | Kopelman et al. |
| 7,077,647 B2 | 7/2006 | Choi et al. |
| 7,108,508 B2 | 9/2006 | Hedge et al. |
| 7,134,874 B2 | 11/2006 | Chishti et al. |
| 7,156,661 B2 | 1/2007 | Choi et al. |
| 7,160,107 B2 | 1/2007 | Kopelman et al. |
| 7,241,142 B2 | 7/2007 | Abolfathi et al. |
| 7,293,988 B2 | 11/2007 | Wen |
| 7,309,230 B2 | 12/2007 | Wen |
| 7,357,634 B2 | 4/2008 | Knopp |
| 7,555,403 B2 | 6/2009 | Kopelman et al. |
| 7,637,740 B2 | 12/2009 | Knopp |
| 7,689,398 B2 | 3/2010 | Cheng et al. |
| 7,736,147 B2 | 6/2010 | Kaza et al. |
| 7,746,339 B2 | 6/2010 | Matov et al. |
| 7,844,356 B2 | 11/2010 | Matov et al. |
| 7,865,259 B2 | 1/2011 | Kuo et al. |
| 7,878,804 B2 | 2/2011 | Korytov et al. |
| 7,880,751 B2 | 2/2011 | Kuo et al. |
| 7,904,308 B2 | 3/2011 | Arnone et al. |
| 7,930,189 B2 | 4/2011 | Kuo |
| 7,942,672 B2 | 5/2011 | Kuo |
| 7,970,627 B2 | 6/2011 | Kuo et al. |
| 7,970,628 B2 | 6/2011 | Kuo et al. |
| 8,038,444 B2 | 10/2011 | Kitching et al. |
| 8,044,954 B2 | 10/2011 | Kitching et al. |
| 8,075,306 B2 | 12/2011 | Kitching et al. |
| 8,092,215 B2 | 1/2012 | Stone-Collonge et al. |
| 8,099,268 B2 | 1/2012 | Kitching et al. |
| 8,108,189 B2 | 1/2012 | Chelnokov et al. |
| 8,126,726 B2 | 2/2012 | Matov et al. |
| 8,260,591 B2 | 9/2012 | Kass et al. |
| 8,275,180 B2 | 9/2012 | Kuo |
| 8,401,826 B2 | 3/2013 | Cheng et al. |
| 8,439,672 B2 | 5/2013 | Matov et al. |
| 8,562,338 B2 | 10/2013 | Kitching et al. |
| 8,591,225 B2 | 11/2013 | Wu et al. |
| 8,788,285 B2 | 7/2014 | Kuo |
| 8,843,381 B2 | 9/2014 | Kuo et al. |
| 8,874,452 B2 | 10/2014 | Kuo |
| 8,896,592 B2 | 11/2014 | Boltunov et al. |
| 8,930,219 B2 | 1/2015 | Trosien et al. |
| 9,037,439 B2 | 5/2015 | Kuo et al. |
| 9,060,829 B2 | 6/2015 | Sterental et al. |
| 9,125,709 B2 | 9/2015 | Matty |
| 9,211,166 B2 | 12/2015 | Kuo et al. |
| 9,220,580 B2 | 12/2015 | Borovinskih et al. |
| 9,364,296 B2 | 6/2016 | Kuo |
| 9,375,300 B2 | 6/2016 | Matov et al. |
| 9,414,897 B2 | 8/2016 | Wu et al. |
| 9,492,245 B2 | 11/2016 | Sherwood et al. |
| 9,642,678 B2 | 5/2017 | Kuo |
| 10,248,883 B2 | 4/2019 | Borovinskih et al. |
| 10,342,638 B2 | 7/2019 | Kitching et al. |
| 10,463,452 B2 | 11/2019 | Matov et al. |
| 10,595,966 B2 | 3/2020 | Carrier, Jr. et al. |
| 10,617,489 B2 | 4/2020 | Grove et al. |
| 10,722,328 B2 | 7/2020 | Velazquez et al. |
| 10,758,322 B2 | 9/2020 | Pokotilov et al. |
| 10,779,718 B2 | 9/2020 | Meyer et al. |
| 10,792,127 B2 | 10/2020 | Kopelman et al. |
| 10,828,130 B2 | 11/2020 | Pokotilov et al. |
| 10,835,349 B2 | 11/2020 | Cramer et al. |
| 10,973,611 B2 | 4/2021 | Pokotilov et al. |
| 10,996,813 B2 | 5/2021 | Makarenkova et al. |
| 10,997,727 B2 | 5/2021 | Xue et al. |
| 11,020,205 B2 | 6/2021 | Li et al. |
| 11,020,206 B2 | 6/2021 | Shi et al. |
| 11,026,766 B2 | 6/2021 | Chekh et al. |
| 11,033,359 B2 | 6/2021 | Velazquez et al. |
| 11,071,608 B2 | 7/2021 | Derakhshan et al. |
| 11,096,763 B2 | 8/2021 | Akopov et al. |
| 11,116,605 B2 | 9/2021 | Nyukhtikov et al. |
| 11,147,652 B2 | 10/2021 | Mason et al. |
| 11,151,753 B2 | 10/2021 | Gao et al. |
| 2003/0008259 A1 | 1/2003 | Kuo et al. |
| 2003/0143509 A1 | 7/2003 | Kopelman et al. |
| 2003/0207227 A1 | 11/2003 | Abolfathi |
| 2004/0137400 A1 | 7/2004 | Chishti et al. |
| 2004/0152036 A1 | 8/2004 | Abolfathi |
| 2004/0197728 A1 | 10/2004 | Abolfathi et al. |
| 2004/0259049 A1 | 12/2004 | Kopelman et al. |
| 2005/0182654 A1 | 8/2005 | Abolfathi et al. |
| 2005/0244791 A1 | 11/2005 | Davis et al. |
| 2006/0127836 A1 | 6/2006 | Wen |
| 2006/0127852 A1 | 6/2006 | Wen |
| 2006/0127854 A1 | 6/2006 | Wen |
| 2006/0275731 A1 | 12/2006 | Wen et al. |
| 2006/0275736 A1 | 12/2006 | Wen et al. |
| 2008/0305451 A1* | 12/2008 | Kitching ............... A61C 7/002 433/24 |
| 2008/0306724 A1 | 12/2008 | Kitching et al. |
| 2010/0009308 A1 | 1/2010 | Wen et al. |
| 2010/0068672 A1 | 3/2010 | Arjomand et al. |
| 2010/0068676 A1 | 3/2010 | Mason et al. |
| 2010/0092907 A1 | 4/2010 | Knopp |
| 2010/0167243 A1 | 7/2010 | Spiridonov et al. |
| 2013/0204599 A1 | 8/2013 | Matov et al. |
| 2016/0242870 A1 | 8/2016 | Matov et al. |
| 2016/0310235 A1 | 10/2016 | Derakhshan et al. |
| 2017/0169562 A1* | 6/2017 | Somasundaram ... G06V 10/454 |
| 2017/0273760 A1 | 9/2017 | Morton et al. |
| 2018/0078347 A1* | 3/2018 | Falkel ..................... A61B 1/24 |
| 2018/0280118 A1 | 10/2018 | Cramer |
| 2019/0029784 A1 | 1/2019 | Moalem et al. |
| 2019/0053876 A1 | 2/2019 | Sterental et al. |
| 2019/0192259 A1 | 6/2019 | Kopelman et al. |
| 2019/0328487 A1 | 10/2019 | Levin et al. |
| 2019/0328488 A1 | 10/2019 | Levin et al. |
| 2019/0333622 A1 | 10/2019 | Levin et al. |
| 2020/0000552 A1 | 1/2020 | Mednikov et al. |
| 2020/0000554 A1 | 1/2020 | Makarenkova et al. |
| 2020/0000555 A1 | 1/2020 | Yuryev et al. |
| 2020/0015943 A1* | 1/2020 | Reynard ................... G06T 7/12 |
| 2020/0085546 A1 | 3/2020 | Li et al. |
| 2020/0107915 A1 | 4/2020 | Roschin et al. |
| 2020/0155274 A1 | 5/2020 | Pimenov et al. |
| 2020/0214800 A1 | 7/2020 | Matov et al. |
| 2020/0297458 A1 | 9/2020 | Roschin et al. |
| 2020/0306011 A1 | 10/2020 | Chekhonin et al. |
| 2020/0306012 A1 | 10/2020 | Roschin et al. |
| 2020/0315744 A1 | 10/2020 | Cramer |
| 2020/0360109 A1 | 11/2020 | Gao et al. |
| 2021/0073998 A1 | 3/2021 | Brown et al. |
| 2021/0134436 A1 | 5/2021 | Meyer et al. |
| 2021/0174477 A1 | 6/2021 | Shi et al. |

* cited by examiner

FIG. 9

AUTOMATED ECTOPIC DETECTING ENGINE(S) 901

- ECTOPIC TOOTH IDENTIFICATION ENGINE 905
- TOOTH WIDTH ANALYSIS ENGINE 910
- TOOTH TYPE DATASTORE 915
- TEETH RE-NUMBERING ENGINE 920
- RE-NUMBERED ARCH DATASTORE 925

AUTOMATIC ECTOPIC TEETH DETECTION ON SCAN

CROSS REFERENCE TO RELATED APPLICATIONS

This patent application is a continuation of U.S. patent application Ser. No. 16/407,087, filed on May 8, 2019, titled "AUTOMATIC ECTOPIC TEETH DETECTION ON SCAN," now U.S. Pat. No. 11,154,381, which claims priority to U.S. Provisional Patent Application No. 62/668,693, filed on May 8, 2018, titled "AUTOMATIC ECTOPIC TEETH DETECTION ON SCAN," and is herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

BACKGROUND

A person's dentition may include abnormal teeth that do not reside within the person's dental arch. Examples of such abnormal teeth include ectopic teeth that are located in a transverse or other direction relative to a dental arch, and missing or unerupted or impacted teeth that do not show in scans of the person's dental arch. An ectopic tooth may include a permanent tooth that does not follow its usual course and comes to reside in an abnormal position, (inside or outside a dental arch, above or below, along a transverse/axial direction from its desired position, etc.). An ectopic tooth eruption can result in a tooth being under and/or impacting an adjacent tooth. A tooth may be missing for a variety of reasons, including genetics, prior extraction, or loss of the tooth through trauma or activities. An unerupted tooth may include a tooth (such as a permanent tooth of a pediatric patient) that has not erupted into a patient's arch.

Abnormal teeth may be difficult to identify with dental scan technologies. More specifically, many dental scan technologies perform an optical scan of a patient's arch and represent teeth in the arch using three-dimensional (3D) dental mesh models. Such 3D dental mesh models may help practitioners visualize teeth arrangements and/or simulate treatment outcomes. Many digital scan technologies use automated tooth segmentation systems (e.g., automated systems that identify and/or number individual teeth and/or dental features in a 3D dental mesh model). Unfortunately, ectopic, missing, and/or unerupted teeth can be misidentified or missed entirely by automated tooth segmentation systems and/or conventional digital scanning technologies.

SUMMARY

Various implementations address one or more needs to accurately identify abnormal teeth (e.g., ectopic and/or missing teeth) in computer models to accurately produce 3D dental mesh models for orthodontic diagnostics and treatment.

In one aspect, the teeth of a patient's dental arch can be automatically numbered to account for a gap between adjacent teeth. A processor can be configured to receive a digital model of a patient's dental arch and automatically detect that at least one tooth is missing or ectopic in the dental arch if a gap between adjacent teeth exceeds a gap threshold. The teeth in the dental arch can be automatically numbered to account for the at least one tooth that is missing or ectopic. In another aspect, an orthodontic treatment plan can be created to reposition at least one tooth of the patient using the numbering of the teeth.

In one aspect, automatically numbering the teeth in the dental arch to account for the at least one tooth that is missing or ectopic is based on one or more of a width of individual teeth of the patient's dental arch, a buccal/lingual position of individual teeth of the patient's dental arch, and a mesial/distal position of individual teeth of the patient's dental arch. In some aspects, the gap threshold comprises a distance of at least 1 mm or a distance of at least 3 mm.

In one aspect, it can be determined that exactly one tooth is missing or ectopic if the detected gap exceeds a gap threshold of 3 mm but is less than a distance of 3.3 mm. Alternatively, it can be determined that at least two tooth are missing or ectopic if the detected gap exceeds a gap threshold of 3.3 mm.

In one aspect, a dental appliance configured to reposition at least one tooth of the patient can be created from the orthodontic treatment plan.

In one aspect, automatically numbering comprises automatically re-numbering. The teeth can be re-numbered if they have previously been numbered.

In one aspect, an ectopic analysis of a region of the patient's dental arch above or below a detected gap that exceeds an ectopic threshold can be performed, further wherein automatically numbering further comprises automatically numbering the teeth to account for an ectopic tooth identified during the ectopic analysis. In one aspect, performing the ectopic analysis comprises performing an ectopic scan of a region of the patient's dental arch above or below the detected gap that exceeds the ectopic threshold. In some aspects, the ectopic threshold comprises a distance of at least ¼ of an average tooth width of a tooth that is expected to be positioned in the gap, or at least ½ of an average tooth width of a tooth that is expected to be positioned in the gap.

In another aspect automatically numbering teeth in a patient's dental arch to account for a gap between adjacent teeth can include receiving, in a processor, a digital model of a patient's dental arch, receiving or determining an initial numbering for the teeth in the dental arch, automatically detecting that at least one tooth is missing or ectopic in the dental arch if a gap between adjacent teeth exceeds a gap threshold, automatically numbering the teeth in the dental arch to account for the at least one tooth that is missing or ectopic, based on one or more of: a width of individual teeth of the patient's dental arch, a buccal/lingual position of individual teeth of the patient's dental arch, and a mesial/distal position of individual teeth of the patient's dental arch, and creating the orthodontic treatment plan to reposition at least one tooth of the patient using the numbering of the teeth.

In one aspect, a non-transitory computing device readable medium is provided that has instructions stored thereon that are executable by a processor to cause a computing device to perform a method that includes receiving, in a processor, a digital model of a patient's dental arch, automatically detecting that at least one tooth is missing or ectopic in the dental arch if a gap between adjacent teeth exceeds a gap threshold, automatically numbering the teeth in the dental arch to account for the at least one tooth that is missing or ectopic, and creating the orthodontic treatment plan to reposition at least one tooth of the patient using the numbering of the teeth.

In one aspect, automatically numbering the teeth in the dental arch to account for the at least one tooth that is missing or ectopic is based on one or more of a width of individual teeth of the patient's dental arch, a buccal/lingual position of individual teeth of the patient's dental arch, and a mesial/distal position of individual teeth of the patient's dental arch.

In some aspects, the gap threshold comprises a distance of at least 1 mm or a distance of at least 3 mm.

Another aspect can include determining that exactly one tooth is missing or ectopic if the detected gap exceeds a gap threshold of 3 mm but is less than a distance of 3.3 mm, or determining that at least two tooth are missing or ectopic if the detected gap exceeds a gap threshold of 3.3 mm.

In one aspect, a dental appliance configured to reposition at least one tooth of the patient can be created from the orthodontic treatment plan.

In one aspect, automatically numbering comprises automatically re-numbering. The teeth can be re-numbered if they have previously been numbered.

In one aspect, an ectopic analysis of a region of the patient's dental arch above or below a detected gap that exceeds an ectopic threshold can be performed, further wherein automatically numbering further comprises automatically numbering the teeth to account for an ectopic tooth identified during the ectopic analysis. In one aspect, performing the ectopic analysis comprises performing an ectopic scan of a region of the patient's dental arch above or below the detected gap that exceeds the ectopic threshold. In some aspects, the ectopic threshold comprises a distance of at least ¼ of an average tooth width of a tooth that is expected to be positioned in the gap, or at least ½ of an average tooth width of a tooth that is expected to be positioned in the gap.

In one aspect, the teeth of a patient's arch can be re-numbered properly to account for a gap or large distance between adjacent teeth. If the gap or large distance between adjacent teeth exceeds a gap threshold, the teeth posterior to the gap or threshold can be re-numbered appropriately.

In another aspect, gaps or large distances between adjacent teeth in a patient's arch can indicate the presence of an ectopic tooth. Accordingly, a gap or large distance that exceeds and ectopic threshold can trigger a rescan of the patient's arch above the gap for an upper arch or below the gap for a lower arch to look for an ectopic tooth. If an ectopic tooth is found, the teeth in the patient's arch can be re-numbered accordingly.

In another aspect, the widths or dimensions of a tooth or adjacent teeth can be evaluated to determine improper teeth numbering in the presence of a missing or ectopic tooth. The mesial-distal and/or buccal-lingual widths of teeth can be evaluated to determine if a tooth is a molar or a bicuspid, and the teeth can be re-numbered accordingly.

In one aspect, an example of a method of forming an orthodontic treatment plan by automatically re-numbering a patient's teeth to account for a gap between adjacent teeth is provided, comprising receiving, in a processor, a scan of a patient's dental arch, automatically detecting any gaps between adjacent teeth in the dental arch, determining, in the processor, that at least one tooth is missing or ectopic in the dental arch if a detected gap exceeds a gap threshold, automatically numbering the teeth in the dental arch to account for the at least one tooth that is missing or ectopic, and creating the orthodontic treatment plan to reposition at least one tooth of the patient using the numbering of the teeth.

In various aspects, the gap threshold comprises a distance of at least 1 mm, 2 mm, 3 mm, 4 mm, or 5 mm, or at least 3 mm.

In one aspect, determining further comprises determining that exactly one tooth is missing or ectopic if the detected gap exceeds a gap threshold of 3 mm but is less than a distance of 3.3 mm, or determining that at least two tooth are missing or ectopic if the detected gap exceeds a gap threshold of 3.3 mm.

In one aspect, the method can further include creating a dental appliance configured to reposition at least one tooth of the patient from the orthodontic treatment plan.

In one aspect, a non-transitory computing device readable medium is provided having instructions stored thereon that are executable by a processor to cause a computing device to receive a dental scan along a teeth curve of a patient's dental arch, detect any gaps between adjacent teeth in the dental arch, determine that at least one tooth is missing or ectopic if a detected gap exceeds a gap threshold, number the teeth in the dental arch to account for the at least one tooth that is missing or ectopic.

In one aspect, the gap threshold comprises a distance of at least 1 mm, 2 mm, 3 mm, 4 mm, or 5 mm, or at least 3 mm.

In some aspects, the instructions are configured to determine that at least one tooth is missing or ectopic if a detected gap exceeds a gap threshold by determining that exactly one tooth is missing or ectopic if the detected gap exceeds a gap threshold of 3 mm but is less than a distance of 3.3 mm, and are configured to determine that at least one tooth is missing or ectopic if a detected gap exceeds a gap threshold by determining that at least two tooth are missing or ectopic if the detected gap exceeds a gap threshold of 3.3 mm.

In one aspect, an example of a method for identifying an ectopic tooth is provided, comprising receiving, in a processor, a dental scan of a patient's dental arch, automatically detecting any gaps between adjacent teeth in the dental arch, determining, in the processor, that at least one tooth is missing or ectopic if a detected gap exceeds an ectopic threshold, performing an ectopic analysis of a region of the patient's dental arch above or below the detected gap that exceeds the ectopic threshold, numbering the teeth in the dental arch to account for an ectopic tooth found during the ectopic analysis, and creating an orthodontic treatment plan to reposition at least one tooth of the patient using the numbering of the teeth.

In some aspects, the method further comprises creating a dental appliance configured to reposition at least one tooth of the patient.

In one aspect, the method further comprises performing the dental scan of the patient's dental arch.

In some aspects, performing an ectopic analysis comprises performing an ectopic scan of a region of the patient's dental arch above or below the detected gap that exceeds the ectopic threshold. The ectopic threshold can be a distance of at least ¼, ½, or ¾ of an average tooth width of a tooth that is expected to be positioned in the gap. In other aspects, the ectopic threshold can be at least ½ of an average tooth width of a tooth that is expected to be positioned in the gap.

In one aspect, a non-transitory computing device readable medium is provided having instructions stored thereon that are executable by a processor to cause a computing device to receive a dental scan along a teeth curve of a patient's dental arch, detect any gaps between adjacent teeth in the dental arch, determine that at least one tooth is missing or ectopic if a detected gap exceeds an ectopic threshold, perform an ectopic analysis of a region above or below the detected gap that exceeds the ectopic threshold, number the teeth in the dental arch to account for an ectopic tooth found during the ectopic analysis.

In some aspects, the ectopic threshold can be a distance of at least ¼, ½, or ¾ of an average tooth width of a tooth that is expected to be positioned in the gap. In other aspects, the ectopic threshold can be at least ½ of an average tooth width of a tooth that is expected to be positioned in the gap.

In one aspect, an example of a method for automatically numbering a patient's teeth to account for an ectopic tooth is provided, comprising receiving, in a processor, a dental scan along a teeth curve of a patient's dental arch, automatically numbering each of the patient's teeth to a first numbering value, wherein the first numbering corresponds to an expected tooth type, detecting dimensions of each of the patient's teeth, evaluating, in the processor, the width of a target tooth or the widths of adjacent target teeth to determine a tooth type or teeth types, and re-numbering the teeth in the dental arch when the first numbering value of the target tooth or adjacent target teeth do not match the determined tooth type or teeth types.

In one aspect, the method can further comprise creating the dental appliance configured to reposition at least one tooth of the patient.

In some aspects, the dimensions comprise a mesial-distal width and/or a buccal-lingual width of each tooth of the patient's arch.

In one aspect, the evaluating step further comprises calculating a ratio between the mesial-distal width of the target tooth to the buccal-lingual width of the target tooth, determining that the target tooth is not an upper bicuspid if the ratio exceeds an upper bicuspid threshold. In one aspect, the upper bicuspid threshold is 0.83.

In another aspect, the evaluating step further comprises determining if the mesial-distal width of the target tooth is greater than a first lower bicuspid threshold and determining if the buccal-lingual width of the target tooth is greater than a second lower bicuspid threshold, and calculating a ratio between the mesial-distal width of the target tooth to the buccal-lingual width of the target tooth, determining that the target tooth is not a lower bicuspid if the ratio exceeds a third lower bicuspid threshold.

In some aspects, the first lower bicuspid threshold is 7.3 mm, the second lower bicuspid threshold is 8.0 mm, and/or the third lower bicuspid threshold is 0.93.

In one aspect, the evaluating step further comprises calculating a ratio between the mesial-distal widths of adjacent teeth, determining that the adjacent teeth are a molar/bicuspid pair if the ratio exceeds a molar bicuspid threshold. In one aspect, the molar bicuspid threshold is at least 1.3.

In another aspect, the evaluating step further comprises calculating a ratio between the mesial-distal widths of adjacent teeth, determining that the adjacent teeth are a molar/molar pair or a bicuspid/bicuspid pair if the ratio is approximately 1.

In one aspect, a computer-implemented method is provided, comprising gathering a digital scan of a dental arch of a patient, gathering a virtual representation of the scanned dental arch, gathering a model segmentation of the model dental arch, the model segmentation providing a basis to assign anatomical identifiers corresponding to each tooth in the model dental arch, and determining whether the scanned dental arch contains at least one abnormal dental structure, the at least one abnormal dental structure being inconsistent with at least two adjacent teeth in the model dental arch, creating a segmentation of the scanned dental arch by modifying the model segmentation of the model dental arch with an anatomical identifier corresponding to the abnormal dental structure.

In one aspect, the method comprises identifying an abnormal tooth corresponding to the abnormal dental structure, and gathering the anatomical identifier using an identifier of the abnormal tooth.

In some aspects, the abnormal dental structure comprises a spatial gap between the at least two adjacent teeth, the spatial gap exceeding a specified gap threshold.

In another aspect, the abnormal dental structure comprises: a first tooth geometry of a first tooth in the model dental arch and a second tooth geometry of a second tooth in the model dental arch, the second tooth being non-adjacent teeth to the first tooth in the model dental arch.

In one aspect, the abnormal dental structure corresponds to one or more of an ectopic tooth and a missing tooth not residing in the scanned dental arch.

In another aspect, the method further comprises digitally scanning the dental arch of the patient. In one aspect, the digital scan is gathered from one or more of an optical scan, an intraoral scan, and an image capture of physical impressions of the patient.

In another aspect, the method comprises determining whether the scanned dental arch contains at least one abnormal dental structure comprises determining whether there is a spatial gap between the at least two adjacent teeth, the spatial gap exceeding a specified gap threshold.

In some aspects, determining whether the scanned dental arch contains at least one abnormal dental structure comprises determining whether two adjacent teeth in the scanned dental arch have geometries inconsistent with two adjacent teeth in the model dental arch.

In another aspect, the method further comprises evaluating an area of interest around the abnormal dental structure for an ectopic tooth. In one aspect, evaluating the area of interest around the abnormal dental structure for the ectopic tooth comprises performing a scan in a traverse direction for the ectopic tooth.

In yet another aspect, the method comprising providing instructions to display the at least one abnormal dental structure on an electronic display.

In one aspect, the method can comprise identifying a first tooth at a first end of the at least one abnormal dental structure, identifying a second tooth at a second end of the at least one abnormal dental structure, gathering a first anatomical identifier of the first tooth, and gathering a second anatomical identifier of the second tooth.

In one aspect, a system is provided comprising one or more processors, memory coupled to the one or more processors, the memory configured to store computer-program instructions that, when executed by the processor, cause the processor to execute a computer-implemented method, the computer-implemented method comprising gathering a digital scan of a dental arch of a patient, gathering a virtual representation of the scanned dental arch, gathering a model segmentation of the model dental arch, the model segmentation providing a basis to assign anatomical identifiers corresponding to each tooth in the model dental arch, and determining whether the scanned dental arch contains at least one abnormal dental structure, the at least one abnormal dental structure being inconsistent with at least two adjacent teeth in the model dental arch, creating a segmentation of the scanned dental arch by modifying the model segmentation of the model dental arch with an anatomical identifier corresponding to the abnormal dental structure.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIG. 9 is a diagram showing an example of an automated ectopic detecting engine.

DETAILED DESCRIPTION

Figure 1A:
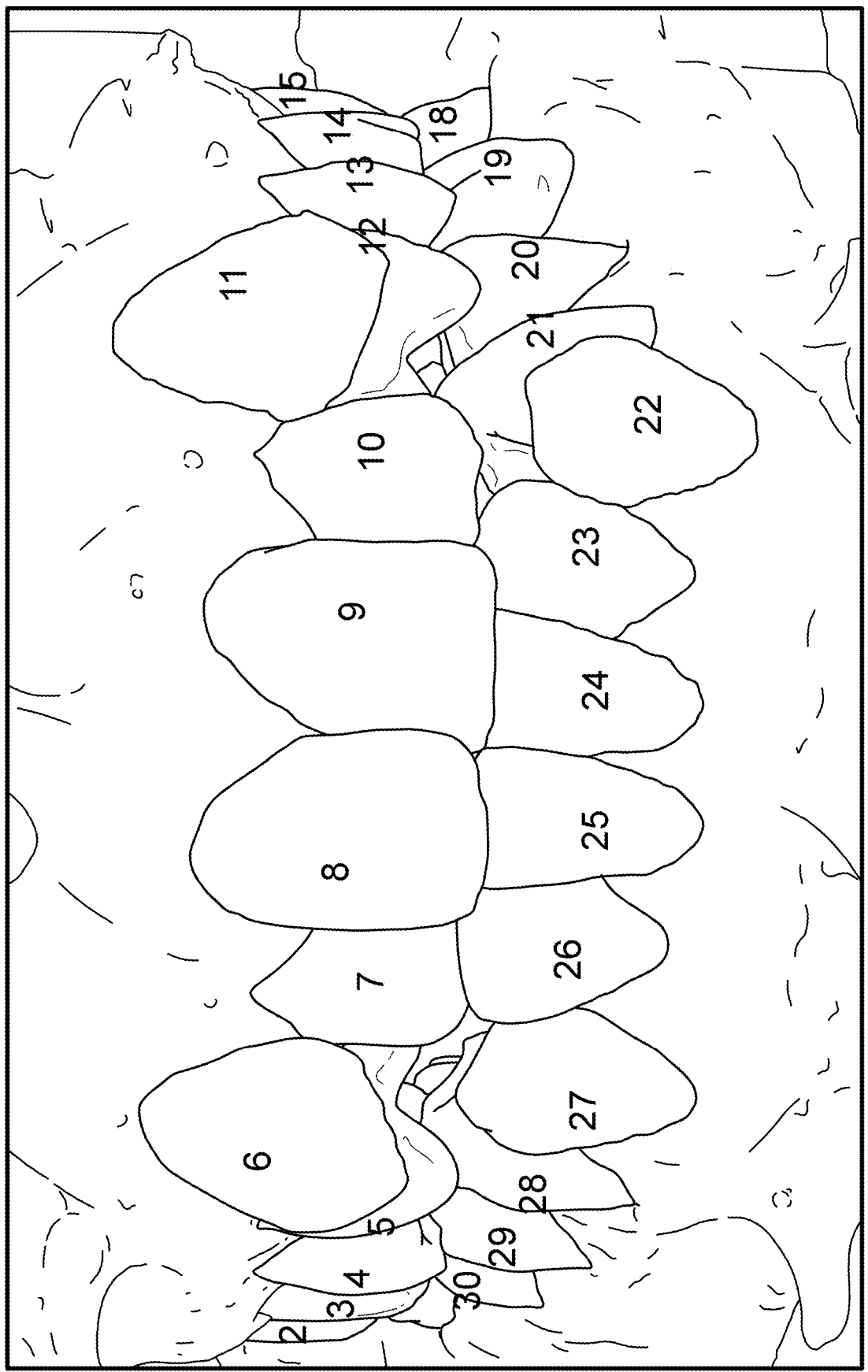
FIG. 1A shows an example of ectopic teeth in a patient's arch.

The present disclosure is related to systems, methods, computing device readable media, and devices for identifying ectopic teeth during automated teeth segmentation in orthodontic applications. The systems, methods, and computing devices herein solve technical problems related to design and segmentation of models of a patient's arch, including identifying missing or ectopic teeth and properly numbering the teeth of the patient's arch to account for the missing or ectopic teeth.

The planning and fabrication of such dental appliances, including elastic polymeric positioning appliances, is described in detail in U.S. Pat. No. 5,975,893, and in published PCT application WO 98/58596, which is herein incorporated by reference for all purposes. Systems of dental appliances employing technology described in U.S. Pat. No. 5,975,893 are commercially available from Align Technology, Inc., San Jose, Calif., under the tradename, Invisalign System.

Throughout the body of the Description of Embodiments, the use of the terms "orthodontic aligner", "aligner", or "dental aligner" is synonymous with the use of the terms "appliance" and "dental appliance" in terms of dental applications. For purposes of clarity, embodiments are hereinafter described within the context of the use and application of appliances, and more specifically "dental appliances."

The methods described below can be integrated into an orthodontic treatment plan when a patient has been identified as having one or more ectopic teeth. Identifying that a patient's arch contains ectopic teeth may be made automatically (e.g., using a computing device). For example, identification can be performed by a computing system automatically by evaluating data (such as a scan or dental impression) of the patient's teeth or arch.

As described herein, an intraoral scanner may image a patient's dental arch and generate a virtual three-dimensional model of that dental arch. During an intraoral scan procedure (also referred to as a scan session), a user (e.g., a dental practitioner) of an intraoral scanner may generate multiple different images (also referred to as scans or medical images) of a dental site, model of a dental site, or other object. The images may be discrete images (e.g., point-and-shoot images) or frames from a video (e.g., a continuous scan). The intraoral scanner can automatically generate a 3D model of the patient's teeth, which can be used for treatment planning.

Ectopic, missing, and/or unerupted teeth are difficult to identify with digital scan technologies, particularly those technologies that use automated tooth segmentation systems. An automated tooth segmentation system, as used herein, may include a system that uses automated agents to identify and/or number individual teeth and/or dental features of virtual representations of teeth, such as teeth represented in a 3D dental mesh model resulting from a digital scan. One technique for segmenting and/or numbering the individual teeth involves the application of a "feature skeleton" analysis to a volumetric representation of the dentition model. In general, a computer applying this technique identifies a core of voxels that forms a skeleton for the dentition. The skeleton roughly resembles the network of biological nerves within patient's teeth. The computer then divides the skeleton into branches, each containing voxels that lie entirely within one tooth. One technique for identifying the branches is by defining a plane that cuts through the skeleton roughly parallel to the occlusal plane of the patient's dentition ("horizontal plane"). Each branch intersects the horizontal plane at one or more points, or clusters, that are relatively distant from the clusters associated with the other branches. The computer forms the individual tooth models by linking other voxels to the appropriate branches of the skeleton. Additional details on identifying individual teeth from a dental model are described in U.S. Pat. No. 7,247,021, which is incorporated herein by reference in its entirety.

An example of ectopic teeth in an arch, FIG. 1A illustrates a 3D model of a patient's upper arch and lower arch, including teeth 2-15 on the upper arch and teeth 18-30 on the lower arch according to the universal numbering system. As shown in FIG. 1A, teeth 6, 11, and 22 are ectopic, as teeth 6 and 11 are shifted up in the arch from their desired position in the upper arch and tooth 22 is shifted down from its desired position in the lower arch.

Figure 1B:
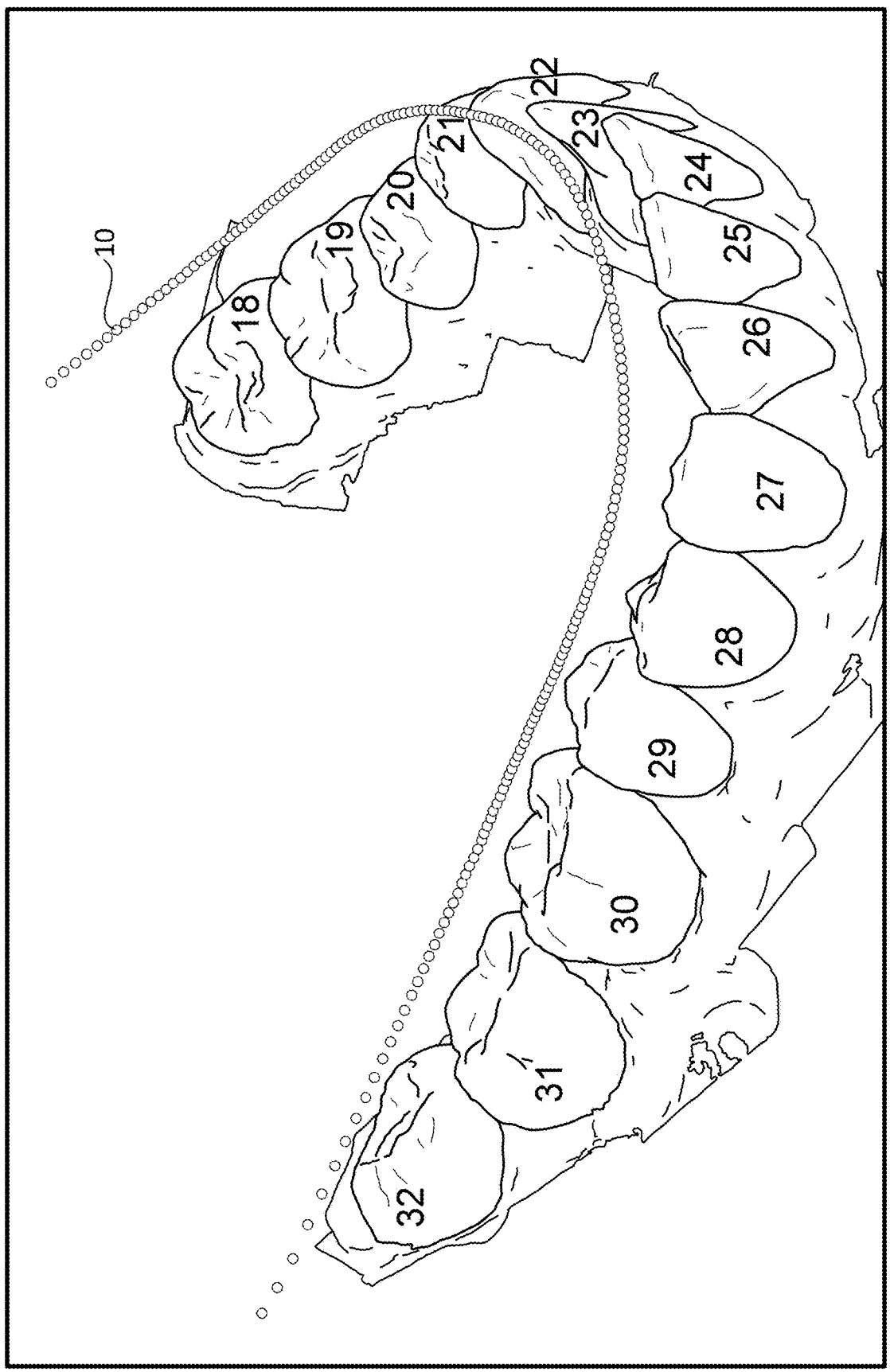
FIG. 1B illustrates an example of a dental scan along a teeth curve.

As an example of digital scan technologies, FIG. 1B illustrates a basic tooth segmentation process along a lower arch that searches for teeth along a teeth curve 10. In the illustrated example, a simple scan along the teeth curve 10 can detect the width of each tooth and also the distance between adjacent teeth (e.g., gaps). A simple scan performed on the arch of FIG. 1B would identify teeth 18-32 because all the teeth are positioned along the teeth curve, and there are no missing or ectopic teeth. Once the teeth are identified by the process, they can be automatically numbered sequentially based on the universal tooth numbering system. The numbering typically starts at the incisors since they are easy to identify in the scan and occurs sequentially towards the posterior teeth (molars).

A basic tooth segmentation process that scans along the teeth curve 10 is likely to fail to identify ectopic or missing teeth, and is also likely to improperly number the identified teeth. For example, if a tooth segmentation process searched along a teeth curve of the lower jaw in FIG. 1A, the process would likely fail to identify ectopic tooth 22. In this example, teeth 18-21 would likely be identified and numbered correctly by the process, but as a result of missing tooth 22, teeth 23-32 would all be numbered incorrectly. More specifically, the process would incorrectly number tooth 23 as tooth 22, incorrectly number tooth 24 as tooth 23, and so forth since all teeth are numbered sequentially.

The present disclosure presents one or more novel processes for identifying and/or numbering all teeth, including ectopic teeth, during an ectopic tooth segmentation process. Some implementations herein may solve technical problems related to optimizing and/or increasing the accuracy of digital dental scanning technologies. The ectopic tooth segmentation processes described herein advantageously may: 1) properly re-number teeth while accounting for missing or ectopic teeth, 2) detect ectopics in spaces between teeth, and 3) detect ectopics in spaces in teeth numeration. In some implementations, the ectopic tooth segmentation process described herein is performed after the basic tooth segmentation process along a teeth curve as illustrated in FIG. 1B.

Correctly Segmenting a Scanned Dental Arch by Accounting for Abnormal Teeth

Figure 2A:
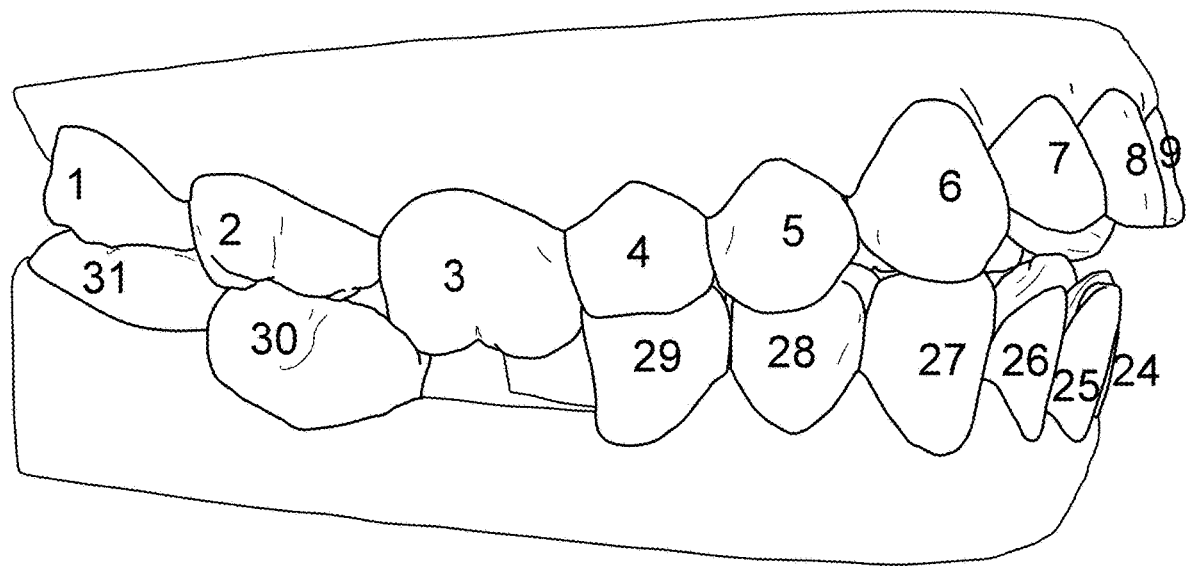
FIGS. 2A-2B illustrate an example of a patient's dental arch with a large gap or distance between adjacent teeth.
Figure 2B:
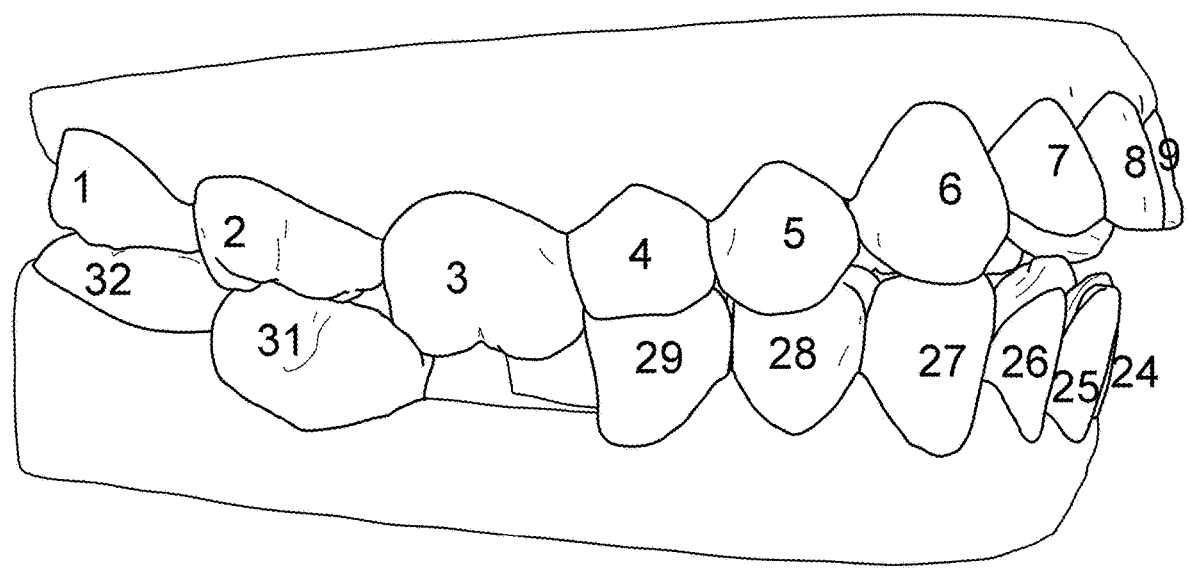

FIG. 2A illustrates teeth numeration from a basic tooth segmentation process without accounting for gaps or missing teeth. As can be seen in FIG. 2A, teeth 32 and 31 are improperly numbered as teeth 31 and 30, respectively, due to of missing (or ectopic) tooth 30. The improper numbering is a result of numbering the teeth sequentially from the anterior to posterior teeth without accounting for gaps or missing teeth. Thus, in FIG. 2A, a simple numbering sequence on the lower jaw may start with incisor 25 and increase sequentially towards the molars. Since tooth 30 (first molar) is missing in FIG. 2A, the simple numbering sequence will improperly number tooth 31 (second molar) as tooth 30, and will improperly number tooth 32 (third molar) as tooth 31. In contrast, FIG. 2B shows teeth 32 and 31 properly numbered.

Figure 3A:
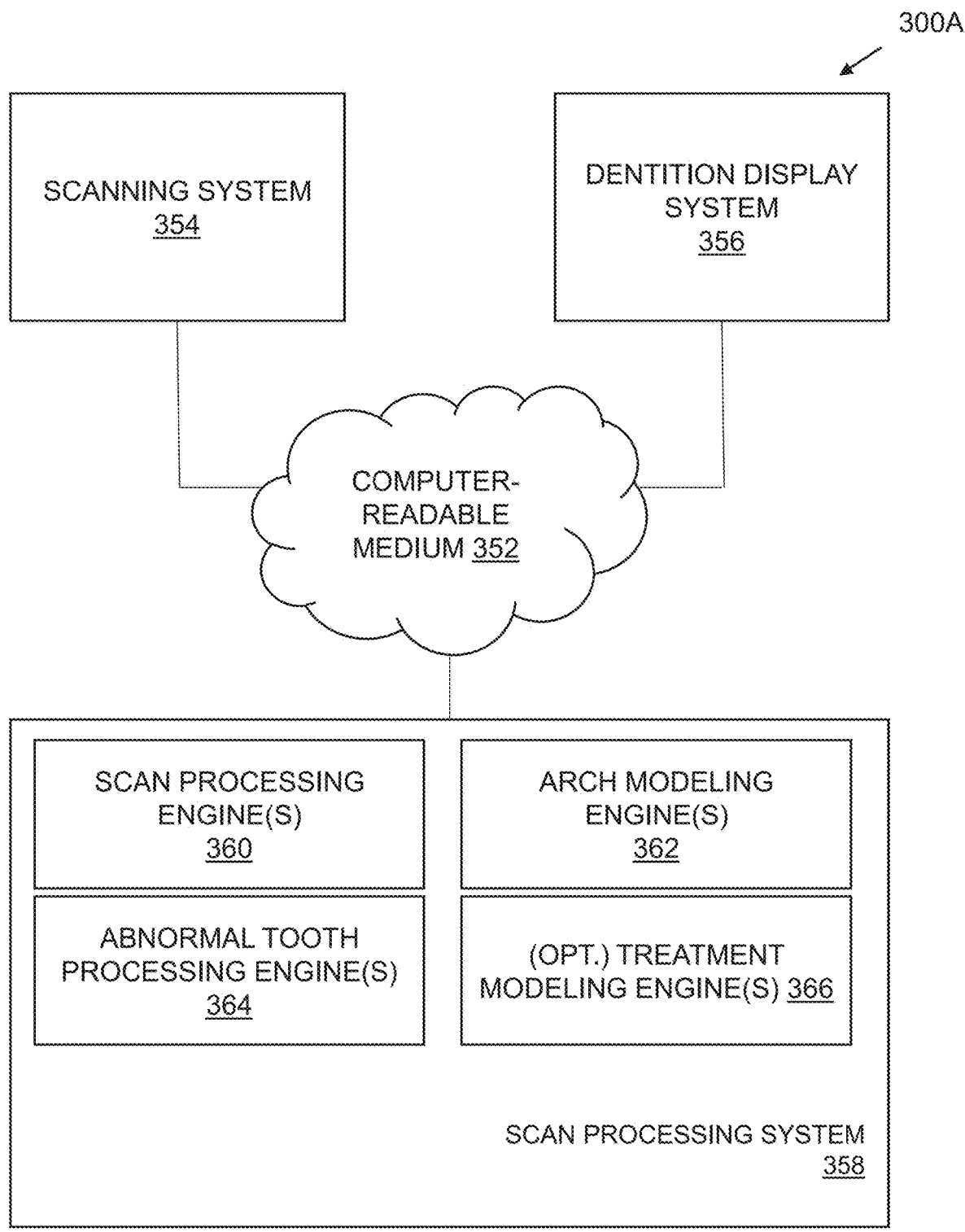
FIG. 3A is a diagram showing an example of a computing environment configured to digitally scan a dental arch with abnormal teeth therein.

FIG. 3A is a diagram showing an example of a computing environment 300A configured to digitally scan a dental arch with abnormal teeth therein. The environment 300A includes a computer-readable medium 352, a scanning system 354, a dentition display system 356, and a scan processing system 358. One or more of the modules in the computing environment 300A may be coupled to one another or to modules not explicitly shown.

The computer-readable medium 352 and other computer readable media discussed in this paper are intended to represent a variety of potentially applicable technologies. For example, the computer-readable medium 352 can be used to form a network or part of a network. Where two components are co-located on a device, the computer-readable medium 352 can include a bus or other data conduit or plane. Where a first component is co-located on one device and a second component is located on a different device, the computer-readable medium 352 can include a wireless or wired back-end network or LAN. The computer-readable medium 352 can also encompass a relevant portion of a WAN or other network, if applicable.

The scanning system 354 may include a computer system configured to capture still images, video, and/or other media of a patient's dental arch. The scanning system 354 may include memory, one or more processors, and sensors to detect contours on a patient's dental arch. The scanning system 354 may be implemented as a camera, an intraoral scanner, an x-ray device, an infrared device, etc. The scanning system can also be a high-quality cone-beam computer tomography volumetric scanner using a marching cubes algorithm, for example. The scanning system 354 may include a system configured to provide a virtual representation of a mold of patient's dental arch. A "dental arch," as used herein, may include at least a portion of a patient's dentition formed by the patient's maxillary or mandibular teeth, when viewed from an occlusal perspective. A dental arch may include one or more maxillary or mandibular teeth of a patient, such as all teeth on the maxilla or mandible or a patient. The scanning system 354 may be used as part of an orthodontic treatment plan. In some implementations, the scanning system 354 is configured to capture a patient's dental arch at a beginning stage, an intermediate stage, etc. of an orthodontic treatment plan.

The dentition display system 356 may include a computer system configured to display at least a portion of a dentition of a patient. The dentition display system 354 may include memory, one or more processors, and a display device to display the patient's dentition. The dentition display system 356 may be implemented as part of a computer system, a display of a dedicated intraoral scanner, etc. In some implementations, the dentition display system 356 facilitates display of a patient's dentition using scans that are taken at an earlier date and/or at a remote location. It is noted the dentition display system 356 may facilitate display of scans taken contemporaneously and/or locally to it as well. As noted herein, the dentition display system 356 may be configured to display the intended or actual results of an orthodontic treatment plan applied to a dental arch scanned by the scanning system 354. The results may include 3D virtual representations of the dental arch, 2D images or renditions of the dental arch, etc.

The scan processing system 358 may include a computer system configured to process scans of a patient's dentition taken by the scanning system 354. As noted herein, the scan processing system 358 may be configured to process scans of abnormal teeth in a dental arch. "Abnormal teeth," as used in this context, may refer to teeth that do not show up in a scan of a dental arch due to a variety of factors. Abnormal teeth may include ectopic teeth, teeth that are missing due to various reason (genetics, trauma, removal, etc.), unerupted teeth, etc. The scan processing system 358 may include scan processing engine(s) 360, arch modeling engine(s) 362, abnormal tooth processing engine(s) 364, and optional treatment modeling engine(s) 366. One or more of the modules of the scan processing system 358 may be coupled to each other or to modules not shown.

As used herein, any "engine" may include one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the figures herein.

The engines described herein, or the engines through which the systems and devices described herein can be implemented, can be cloud-based engines. As used herein, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used herein, "datastores" may include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described herein.

Datastores can include data structures. As used herein, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described herein, can be cloud-based datastores. A cloud-based datastore is a datastore that is compatible with cloud-based computing systems and engines.

The scan processing engine(s) 360 may implement one or more automated agents configured to interface with the scanning system 354. The scan processing engine(s) 360 may include graphics engines to gather scans of a dental arch. In some implementations, the scan processing engine(s) 360 format raw data from a scan of a dental arch into a 3D dental mesh models of the dental arch. The 3D dental mesh models may comprise polyhedral objects that depict teeth and/or other elements of the dental arch in a format that can be rendered on the dentition display system 356. The scan processing engine(s) 360 may provide 3D dental mesh models and/or other data to other modules of the scan processing system 358.

The arch modeling engine(s) 362 may implement one or more automated agents configured to model 3D dental mesh models into virtual representations of dental arches. In some implementations, the arch modeling engine(s) 362 assign physical and/or geometrical properties to a 3D dental mesh models that are related to physical/geometrical properties of dental arches. As an example, the arch modeling engine(s) 362 may implement one or more automated segmentation agents that assign tooth identifiers (e.g., universal tooth numbers) to specific portions of a 3D dental mesh model. The arch modeling engine(s) 362 may further evaluate curves and/or other geometric properties of a 3D dental mesh model to determine whether a scan corresponds to a maxilla, a mandible, or other portion of a patient's dentition.

The abnormal tooth processing engine(s) 364 may implement one or more automated agents configured to identify and/or accommodate abnormal dental structures. An "abnormal dental structure," as used herein, may include any dental structure (e.g., tooth or combination of teeth) that is inconsistent with the geometry of at least two teeth in a model dental arch. An abnormal dental structure may include, e.g., an abnormal tooth such as an ectopic tooth. An abnormal dental structure may also include a missing or unerupted tooth, which, on a dental scan, may show up as two normally non-adjacent teeth being adjacent to each other. In some implementations, the abnormal tooth processing engine(s) 364 are configured to analyze a patient's dental arch for gaps, e.g., to determine whether a patient's dental arch contains significant gaps (e.g., gaps that exceed a specified gap threshold) between teeth. The abnormal tooth processing engine(s) 364 may further be configured to evaluate whether adjacent teeth in a patient's dental arch correspond to similar adjacent teeth in an ideal or model dental arch or whether the adjacent teeth in a patient's dental arch correspond to teeth that are typically separated by one or more other teeth in the ideal or model dental arch. The abnormal tooth processing engine(s) 364 may further be configured to perform secondary scans (e.g., scans in a transverse direction) to detect abnormal teeth, such as ectopic teeth. In various implementations, the abnormal tooth processing engine(s) 364 provide the arch modeling engine(s) 362 and/or other modules instructions to "re-segment," such as re-number the teeth in a scan of a dental arch in order to accommodate abnormal teeth in that dental arch. An example of the abnormal tooth processing engine(s) 364 is shown as the abnormal tooth processing engine(s) 364b, in FIG. 3B. Additionally or alternatively, the abnormal tooth processing engine(s) 364 may include: one or more modules of the automated gap detecting engine 301 shown in FIG. 3D; one or more modules of the automated ectopic detecting engine(s) 601 shown in FIG. 6; and one or more modules of the automated ectopic detecting engine(s) 901 shown in FIG. 9.

The optional treatment modeling engine(s) 366 may be configured to store orthodontic treatment plans and/or the results of orthodontic treatment plans. The optional treatment modeling engine(s) 366 may provide the results of orthodontic treatment plans on 3D dental mesh model. The optional treatment modeling engine(s) 366 may model the results of application of orthodontic aligners to the patient's dental arch over the course of an orthodontic treatment plan.

Figure 3B:
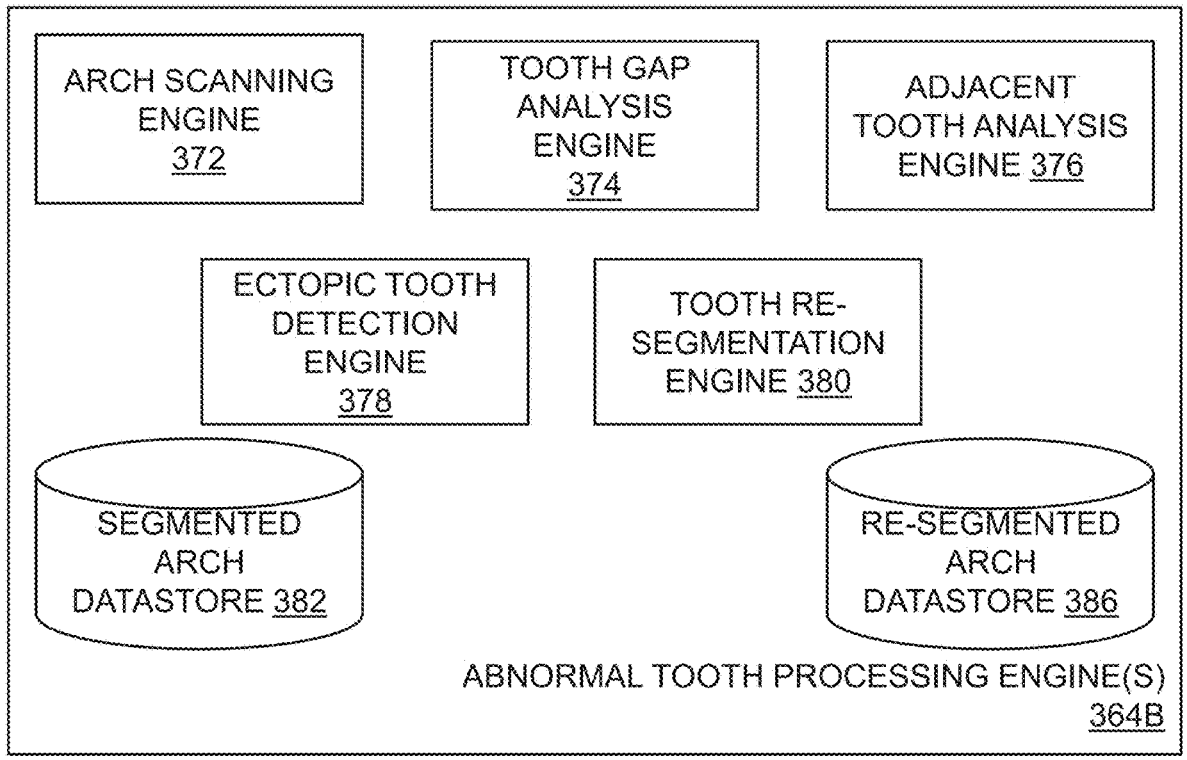
FIG. 3B is a diagram showing an example of abnormal tooth processing engine(s).

FIG. 3B is a diagram showing an example of the abnormal tooth processing engine(s) 364. The abnormal tooth processing engine(s) 364 may include an arch scanning engine 372, a tooth gap analysis engine 374, an adjacent teeth analysis engine 376, an ectopic tooth detection engine 378, a tooth re-segmentation engine 380, a model arch datastore 382, and a re-segmented arch datastore 386. One or more of the modules of the abnormal tooth processing engine(s) 364 may be coupled to each other or to modules not shown.

The arch scanning engine 372 may implement one or more automated agents configured to scan a dental arch for segmentation data. "Segmentation data," as used herein, may include positions, geometrical properties (contours, etc.), and/or other data that can form the basis of segmenting a dental arch. The arch scanning engine 372 may implement automated agents to number teeth in a dental arch. In some implementations, the arch scanning engine 372 begins numbering teeth at anterior portion (e.g., the midline) of a dental arch and continues numbering through posterior portion(s) of the dental arch.

The tooth gap analysis engine 374 may implement one or more automated agents configured to analyze a dental arch for the presence or absence of spatial gaps. The tooth gap analysis engine 374 may determine whether the space between two adjacent teeth in a dental arch meets or exceeds a gap threshold. A "gap threshold," as used herein, may comprise a minimum distance between two teeth from which to infer the existence of an abnormal tooth. A gap threshold may comprise a general threshold for all patients, or may comprise one or more specific thresholds that depend on age or other attributes of patients. In various implementations, the tooth gap analysis engine 374 provides other modules, (ectopic tooth detection engine 378, the tooth re-segmentation engine 380, etc.) with specific areas of a dental arch that contain significant spatial gaps, such as those that meet or exceed one or more gap thresholds.

The adjacent tooth analysis engine 376 may implement one or more automated agents configured to analyze tooth dimensions of adjacent teeth in a dental arch. The adjacent tooth analysis engine 376 may gather attributes (identifiers, dimensions, etc.) of teeth, e.g., buccal-lingual width and/or mesial-distal width, of adjacent teeth. The adjacent tooth analysis engine 376 may evaluate and/or compare these attributes with attributes of ideal or model adjacent teeth in an ideal or model dental arch. The adjacent tooth analysis engine 376 may provide other modules (ectopic tooth detection engine 378, the tooth re-segmentation engine 380, etc.) with specific areas of a dental arch that contain adjacent teeth that do not match similar teeth in an ideal or model dental arch.

For example, the adjacent tooth analysis engine 376 can evaluate the relationship between the mesial-distal width and the buccal-lingual width to determine the tooth type. In one example, the adjacent tooth analysis engine 376 can evaluate the relationship between the mesial-distal width of a tooth and the buccal-lingual width of a tooth to determine if the tooth is a molar or upper bicuspid. In another example, the mesial-distal width of a tooth can be compared to a first threshold, the buccal-lingual width of the tooth can be compared to a second threshold, and the ratio between the two widths can be compared to a third threshold to determine if the tooth is a molar or a lower bicuspid. In yet another example, the relationship between the mesial-distal widths of adjacent teeth can be evaluated and compared to a threshold to determine if the adjacent teeth are a molar/bicuspid pair.

Figure 3C:
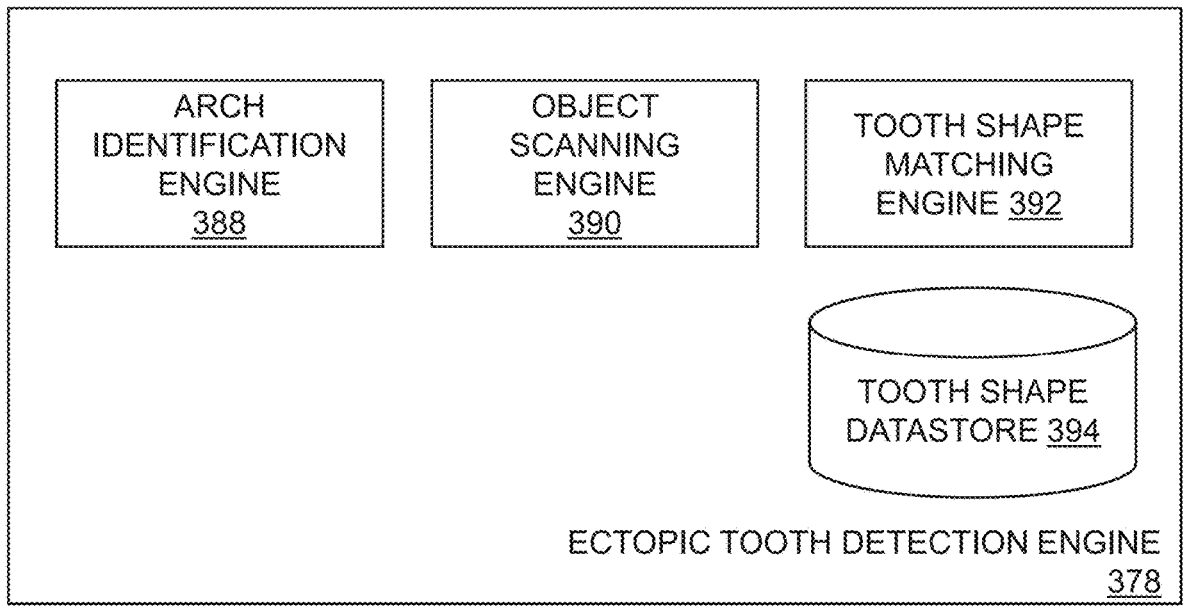
FIG. 3C is a diagram showing an example of an ectopic tooth detection engine.

The ectopic tooth detection engine 378 may implement one or more automated agents configured to detect ectopic teeth in a dental arch that contains significant spatial gaps, abnormal adjacent teeth, or other attributes that indicate the presence of an ectopic tooth. In various implementations, the ectopic tooth detection engine 378 identifies whether a lower or upper dental arch is to be analyzed for ectopic teeth. The ectopic tooth detection engine 378 may further secondary scans near significant gaps or abnormal adjacent teeth to detect teeth that may lie in a transverse direction relative to those significant gaps/abnormal adjacent teeth. The ectopic tooth detection engine 378 may match detected teeth to etalon or other stored representations of teeth. The ectopic tooth detection engine 378 may provide identifiers of ectopic teeth to other modules, such as the tooth re-segmentation engine 380. FIG. 3C shows an example of the ectopic tooth detection engine 378 in greater detail.

The tooth re-segmentation engine 380 may implement one or more automated agents configured to re-segment a dental arch in light of abnormal teeth that were identified in a dental arch. In some implementations, the tooth re-segmentation engine 380 re-segments a dental arch starting with the anterior midline. The tooth re-segmentation engine 380 may continue re-segmentation by moving segments toward the posterior of the dental arch. The tooth re-segmentation engine 380 may separately segment sagittal portions. The tooth re-segmentation engine 380 may skip identifiers/numbers/segments corresponding to missing teeth. The tooth re-segmentation engine 380 may further assign identifiers/numbers/segments to teeth identified as ectopic and/or residing outside the dental arch.

The model arch datastore 382 may be configured to store data related to model dental arches, including model dental arches that have been segmented. The model dental arch data may comprise segments of ideal or model dental arches, including tooth identifiers of teeth normally present in an ideal/model dental arch. The re-segmented arch datastore 386 may be configured to store data related to re-segmented dental arches. The re-segmented dental arch data may comprise segments of dental arches having abnormal teeth; the re-segmented dental arch data may have been stored in the re-segmented arch datastore 386 by the tooth re-segmentation engine 380.

FIG. 3C is a diagram showing an example of the ectopic tooth detection engine 378. The ectopic tooth detection engine 378 may include an arch identification engine 388, an object scanning engine 390, a tooth shape matching engine 392, and a tooth shape datastore 394. One or more of the modules of the ectopic tooth detection engine 378 may be coupled to each other or to modules not shown.

The arch identification engine 388 implement one or more automated agents configured to identify a specific arch to be scanned. The arch identification engine 388 may analyze visual contours and/or receive identifiers of a maxillary or mandibular arch, for instance. The arch identification engine 388 may provide to other modules whether a specific dental arch is being selected for scanning.

The object scanning engine 390 may implement one or more automated agents configured to scan objects around a specific location. The object scanning engine 390 may, for instance, scan for objects located in an approximately transverse direction around a specific area of interest. (As noted herein, the area of interest may have been provided to the object scanning engine 390 through other modules, e.g., the tooth gap analysis engine 394, the adjacent tooth analysis engine 376, etc.). In some implementations, the object scanning engine 390 scans for objects that reside within a locus of an area of interest. The object scanning engine 390 may provide locations and/or other coordinates of objects found as the result of a scan around an area of interest. The object scanning engine 390 may also provide other modules (e.g., the tooth shape matching engine 392) with shapes of objects detected within an area of interest.

The tooth shape matching engine 392 may implement one or more automated agents configured to match objects with tooth shapes. The tooth shape matching engine 392 may compare objects, e.g., those found in an area of interest by the object scanning engine 390, with known shapes of teeth stored in the tooth shape datastore 394. The tooth shape matching engine 392 may gather identifiers (e.g., tooth numbers) of teeth The tooth shape datastore 394 may be configured to store shapes of teeth. In some implementations, the tooth shape datastore 394 stores a library of etalon teeth shapes that form the basis of a match with an ectopic tooth.

Figure 3D:
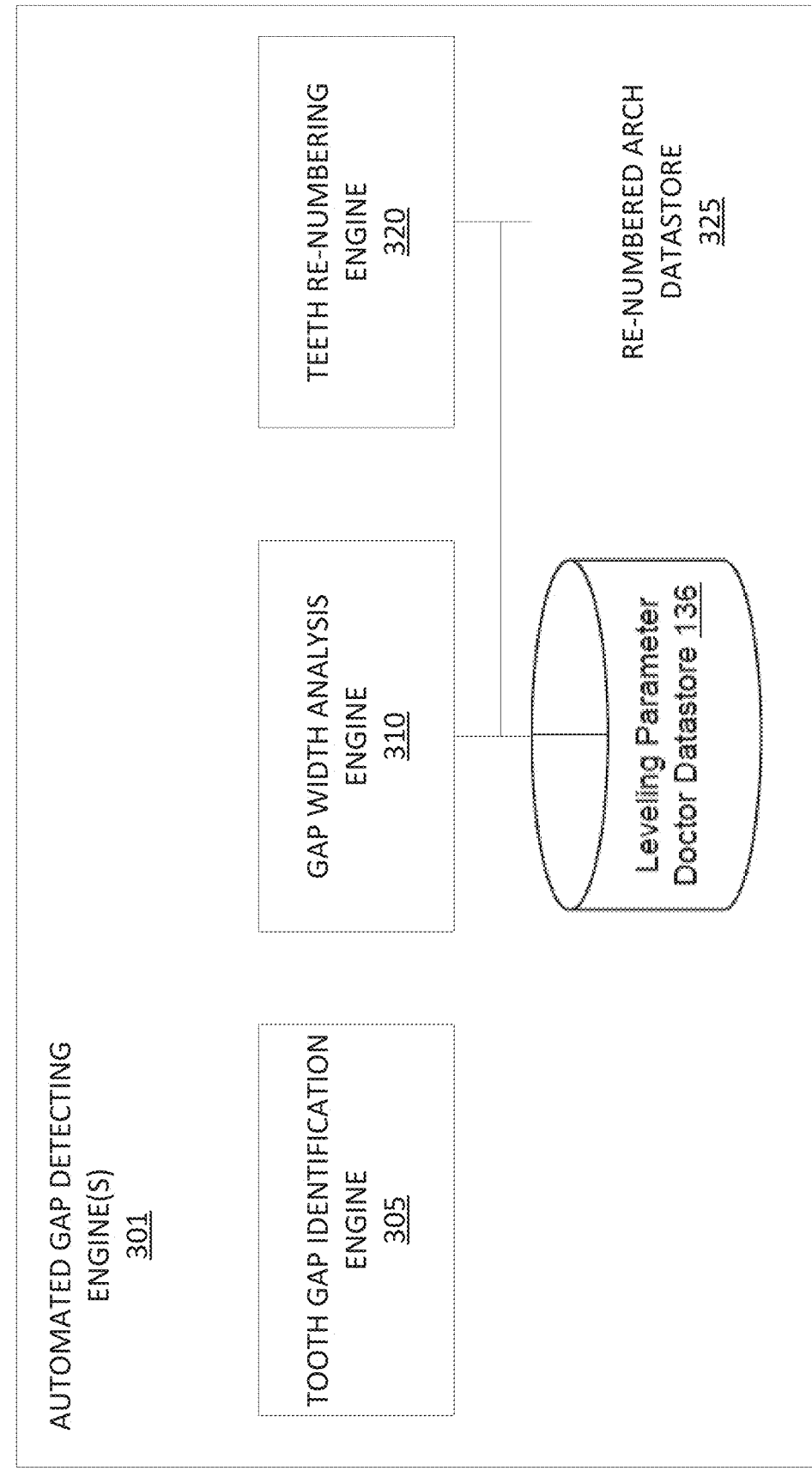
FIG. 3D is a diagram showing an example of an automated gap detecting engine.

FIG. 3D is a diagram showing an example of automated gap detecting engine(s) 301. In this example, the scan processing engine(s) 360 are configured to perform automated gap detection, as noted herein. The automated gap detecting engine(s) 301 may include a tooth gap identification engine 305, a gap width analysis engine 310, a missing or ectopic tooth datastore 315, a teeth re-numbering engine 320, and a re-numbered arch datastore 325. One or more of the modules of the automated gap detecting engine(s) 301 may be coupled to one another.

The tooth gap identification engine 305 may implement one or more automated agents configured to identify one or more missing or ectopic teeth. In some implementations, the tooth gap identification engine 305 receives anatomical tooth identifiers of missing or ectopic teeth through manual input or through an automated system. In an implementation, the tooth gap identification engine 305 may receive tooth numbers and/or character strings input by a medical professional corresponding to a missing or ectopic tooth of a patient. In various implementations, the tooth gap identification engine 305 may receive the results of a scan (e.g., an optical scan) or a virtual representation of a dental mold that identifies missing or ectopic teeth. The tooth gap identification engine 305 may provide identifiers or dimensions of gaps between teeth to other modules, such as the gap width analysis engine 310. In some implementations, this may involve the tooth gap identification engine 305 providing gap dimension or distance data between adjacent teeth. This can be performed in other ways as well.

The gap width analysis engine 310 may implement one or more automated agents configured to identify missing or ectopic teeth based on gaps between adjacent teeth. In some implementations, the gap width analysis engine 310 receives identifiers or dimensions of gaps between teeth, and compares the gap distances to a gap threshold. Gaps between teeth that exceed a gap threshold can be indicative of one or more missing or ectopic teeth in the patient's arch. The missing or ectopic tooth datastore 315 can be configured to store identifiers of the location of the missing or ectopic tooth.

The teeth re-numbering engine 320 may implement one or more automated agents configured to re-number the teeth in a patient's arch while accounting for missing or ectopic teeth. In some implementations, the teeth re-numbering engine 320 receives identifiers of the location of the missing or ectopic tooth from missing or ectopic tooth datastore 315. The teeth re-numbering engine 320 can be configured to re-number the teeth of the patient's arch by accounting for the missing or ectopic teeth locations identified by the gap width analysis engine 310. The teeth re-numbering engine 320 can be configured to store identifiers of the final re-numbered arch in re-numbered arch datastore 325.

Figure 4:
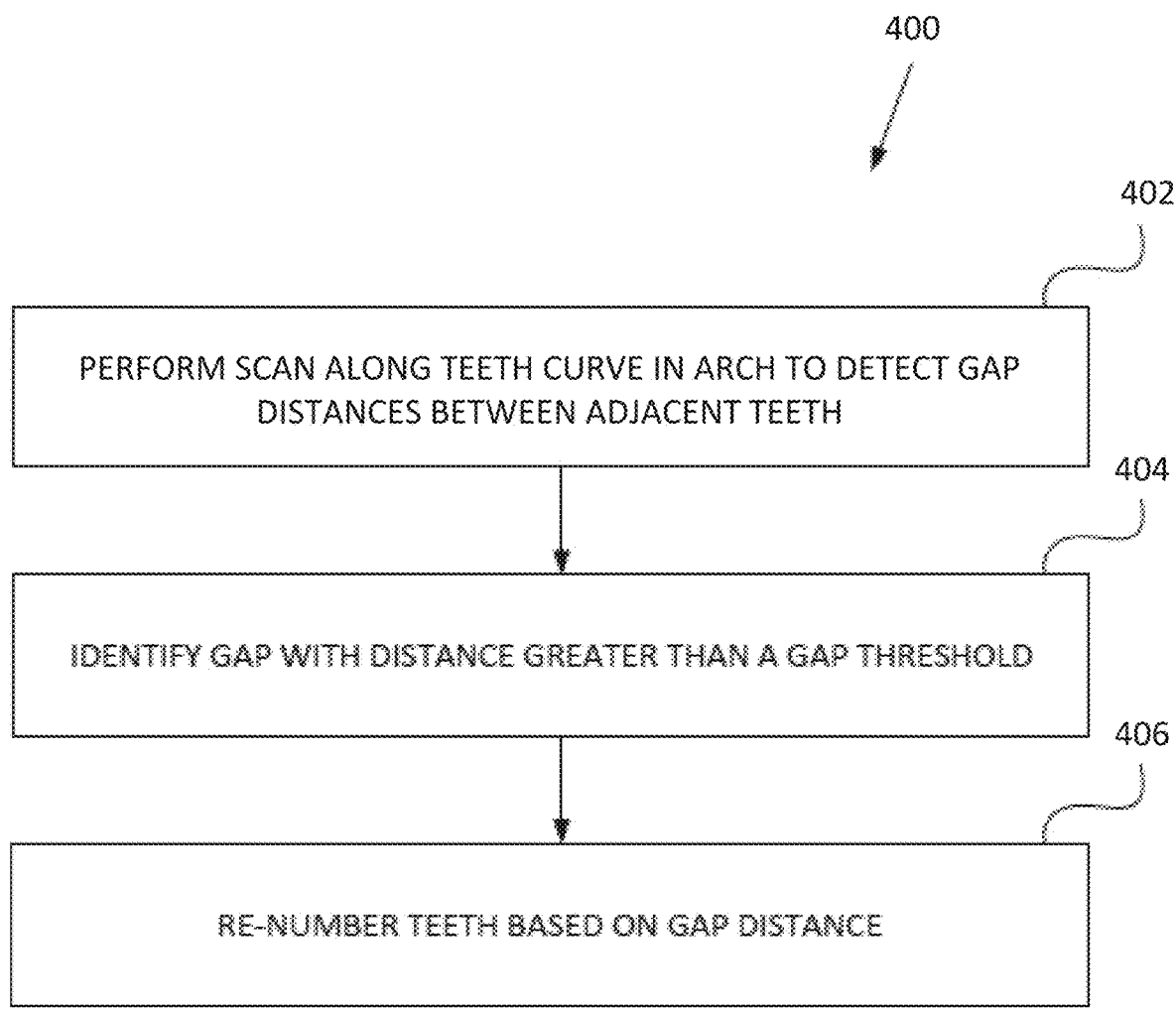
FIG. 4 is a flowchart describing an example of a process for re-numbering teeth in the presence of a large gap or distance between teeth.

FIG. 4 illustrates a flowchart 400 that describes a tooth re-numbering process for properly numbering teeth in the event of a missing or ectopic tooth. The flowchart describes steps that can properly re-number the tooth positioned posterior to a gap in the arch. For example, flowchart 400 describes a process for numbering or re-numbering improperly numbered tooth 30 in FIG. 2A to tooth 31 as shown in FIG. 2B. Referring to step 402 of flowchart 300 the process includes performing a basic scan along a teeth curve of to detect the distances or gaps between adjacent teeth in the patient's arch. This scan can be performed, for example, with an intraoral scanner. In another embodiment, a digital model of a patient's dental arch can be access or received (e.g., if the scan was previously performed).

Next, at step 404, the process includes identifying gaps having distances between adjacent teeth that are greater than a gap threshold. For example, a gap threshold can be defined as a gap having a distance between adjacent teeth that is greater than 3 mm. It should be understood that additional gap tooth thresholds can be used, including distances between adjacent teeth greater than 2 mm, 3.5 mm, 4 mm, etc. A distance that exceeds the gap threshold can be indicative of a missing or ectopic tooth. In one specific example, a distance greater than 3.3 mm can indicate more than one missing or ectopic tooth.

Next, at step 406, the process includes numbering or re-numbering the teeth based on the distance of the gap. For example, if the gap threshold is set to 3 mm, and the identified gap distance between adjacent teeth is 3.1 mm, then the teeth can be re-numbered such that the tooth posterior to the gap accounts for the missing tooth. Referring back to FIGS. 2A-2B, the distance of the gap exceeds the gap threshold, so improperly numbered tooth 31 in FIG. 2A is re-numbered to be tooth 31 as shown in FIG. 2B. As described in step 404, a gap tooth threshold can also be defined to indicate more than one missing or ectopic tooth. For example, a gap threshold of greater than 3.3 mm may indicate two missing teeth. In this example, the teeth can be re-numbered to account for not one, but two missing teeth.

Detecting Ectopics in Spaces Between Teeth

Figure 5:
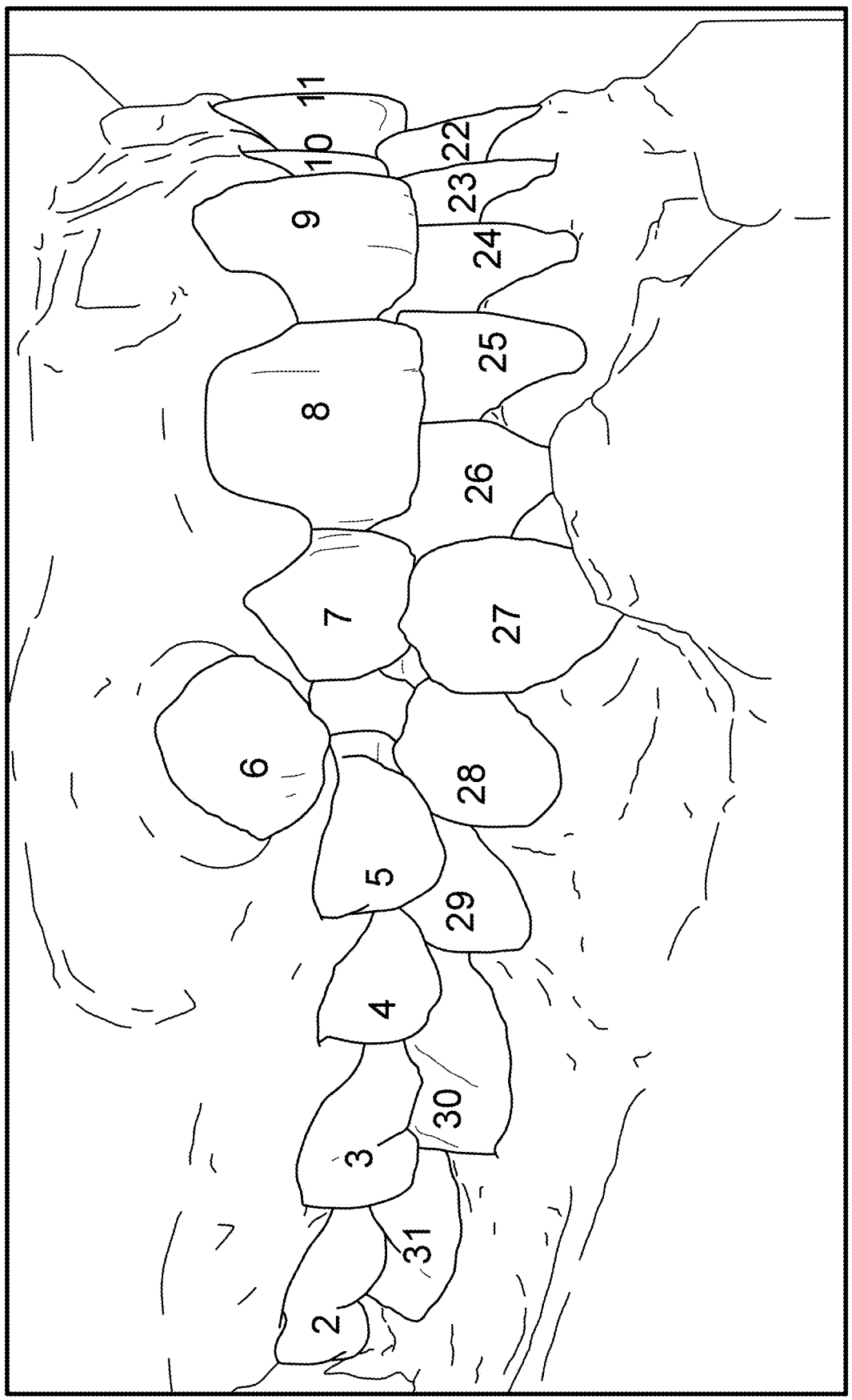
FIG. 5 illustrates an example of an ectopic tooth adjacent to a large gap or distance between teeth.

A conventional tooth segmentation process that scans along the teeth curve will fail to identify ectopic teeth that are significantly above or below the teeth curve, such as tooth 6 in FIG. 5. However, the width and/or dimensions of the teeth and the distance between adjacent teeth from the basic tooth segmentation process can be used to identify ectopic teeth. Referring to FIG. 5, a scan along the teeth curve will identify the distance between teeth 5 and 7, but fail to identify tooth 6.

Figure 6:
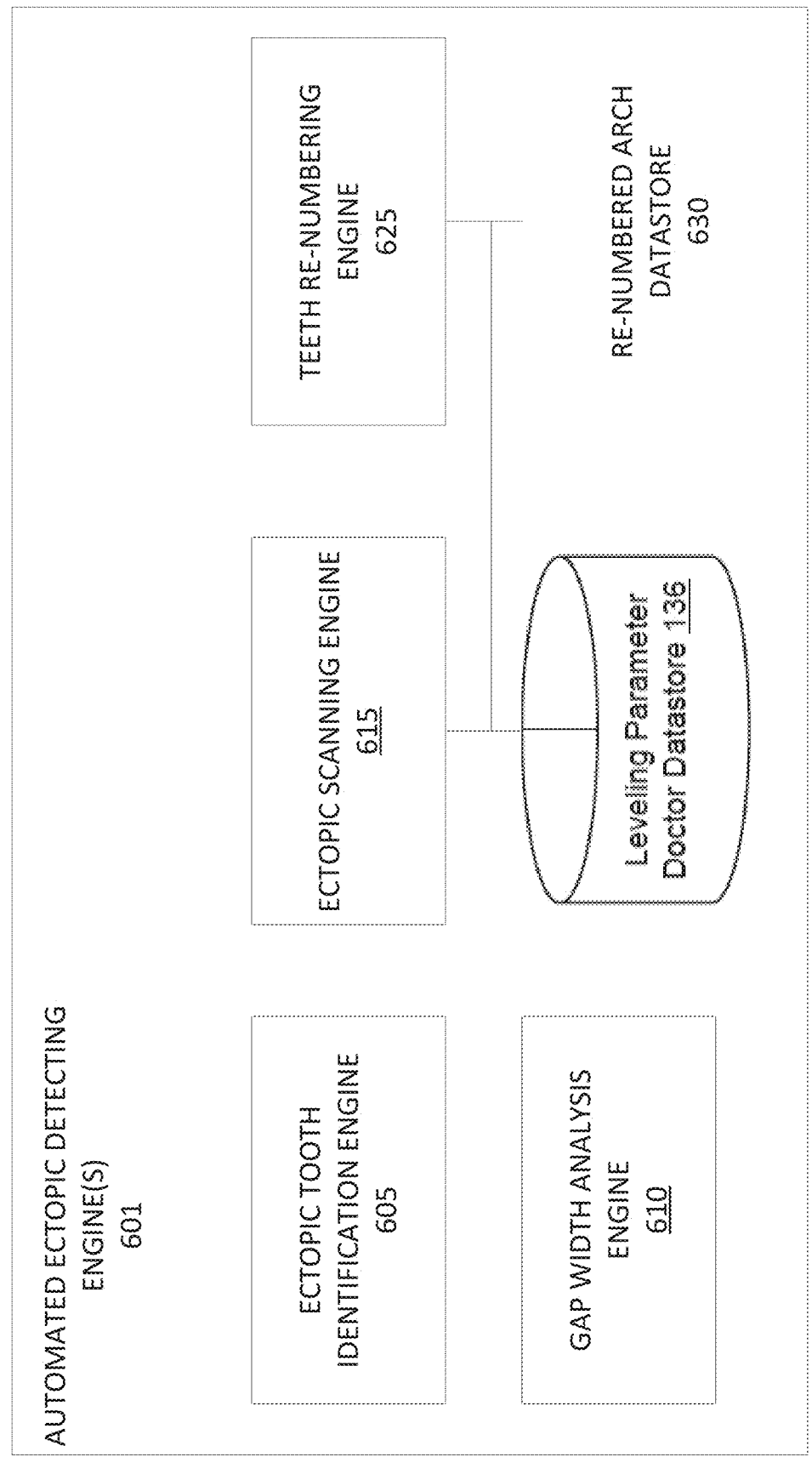
FIG. 6 is a diagram showing an example of an automated ectopic detecting engine.

FIG. 6 is a diagram showing an example of automated ectopic detecting engine(s) 601. The automated ectopic detecting engine(s) 601 may include an ectopic tooth identification engine 605, a gap width analysis engine 610, an ectopic scanning engine 615, an ectopic tooth datastore 620, a teeth re-numbering engine 625, and a re-numbered arch datastore 630. One or more of the modules of the automated ectopic detecting engine(s) 601 may be coupled to one another.

The ectopic tooth identification engine 605 may implement one or more automated agents configured to identify one or more ectopic teeth. In some implementations, the ectopic tooth identification engine 605 receives anatomical tooth identifiers of missing or ectopic teeth through manual input or through an automated system. In an implementation, the ectopic tooth identification engine 605 may receive tooth numbers and/or character strings input by a medical professional corresponding to a missing or ectopic tooth of a patient. In various implementations, the ectopic tooth identification engine 605 may receive the results of a scan (e.g., an optical scan) or a virtual representation of a dental mold that identifies missing or ectopic teeth. The ectopic tooth identification engine 605 may provide identifiers or dimensions of gaps between teeth to other modules, such as the gap width analysis engine 610 or the ectopic scanning engine 615. In some implementations, this may involve the ectopic tooth identification engine 605 providing gap dimension or distance data between adjacent teeth. This can be performed in other ways as well.

The gap width analysis engine 610 may implement one or more automated agents configured to identify missing or ectopic teeth based on gaps between adjacent teeth. In some implementations, the gap width analysis engine 610 receives identifiers or dimensions of gaps between teeth, and compares the gap distances to a gap threshold. Gaps between teeth that exceed a gap threshold can be indicative of one or more missing or ectopic teeth in the patient's arch.

The ectopic scanning engine 615 can be configured to receive identifiers of potential ectopic teeth from the gap width analysis engine 610, and further be configured to receive the results of a scan (e.g., an optical scan) or a virtual representation of a dental mold that identifies missing or ectopic teeth from the ectopic tooth identification engine 605. The ectopic scanning engine 615 is configured to re-scan the optical scan or virtual representation away from the teeth curve at the position of the identified gap (i.e., above the gap for an upper arch or below the gap for a lower arch) to identify an ectopic tooth in the optical scan or virtual representation. If this re-scan identifies an ectopic tooth, the ectopic tooth datastore 620 can be configured to store identifiers of the location of the ectopic tooth.

The teeth re-numbering engine 625 may implement one or more automated agents configured to re-number the teeth in a patient's arch while accounting for missing or ectopic teeth. In some implementations, the teeth re-numbering engine 625 receives identifiers of the location of the ectopic tooth from ectopic tooth datastore 620. The teeth re-numbering engine 625 can be configured to re-number the teeth of the patient's arch by accounting for the ectopic teeth locations identified by the ectopic scanning engine 615. The teeth re-numbering engine 625 can be configured to store identifiers of the final re-numbered arch in re-numbered arch datastore 630.

Figure 7:
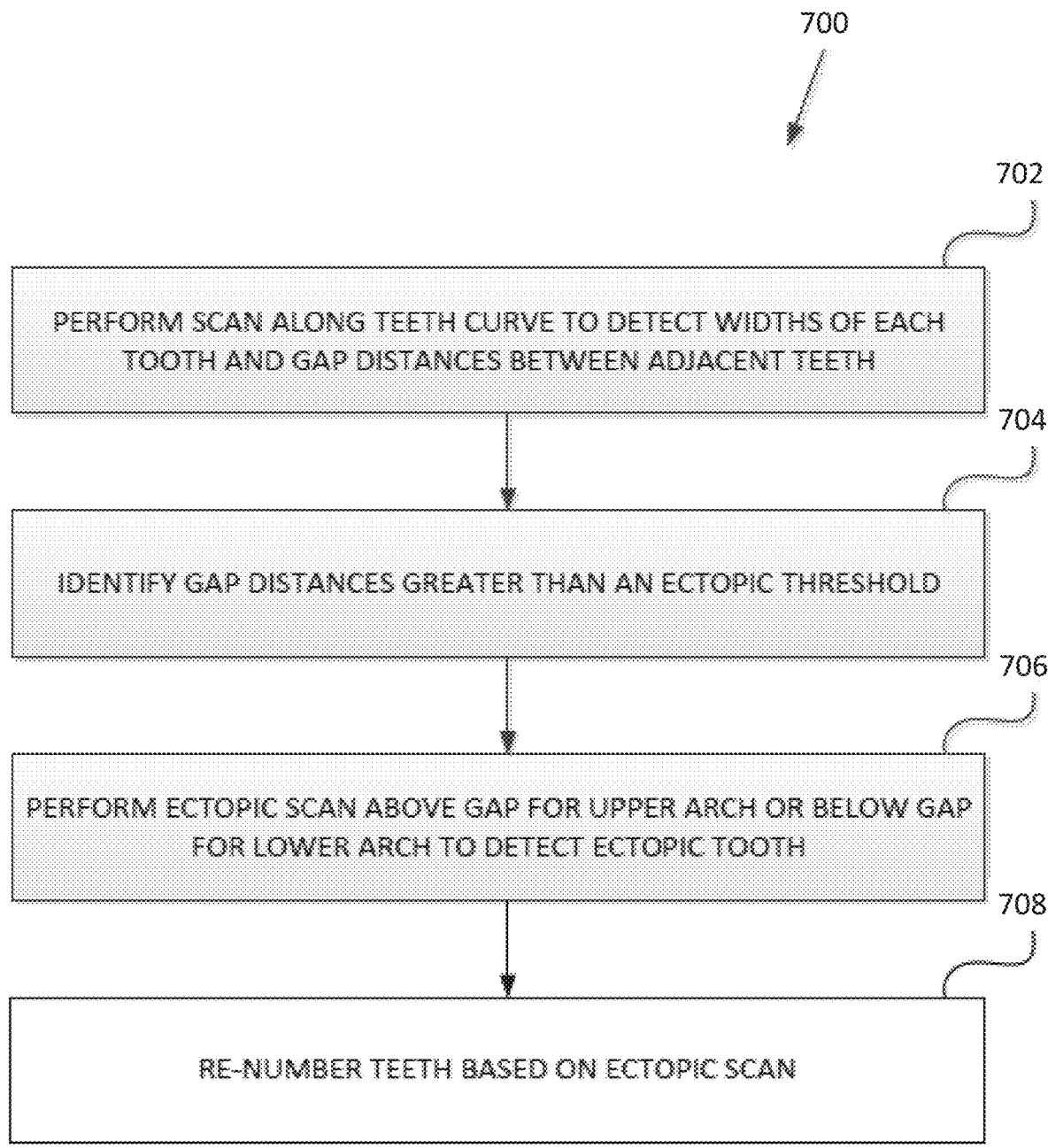
FIG. 7 is a flowchart describing an example of a process for identifying an ectopic tooth near a large gap or distance between teeth.

FIG. 7 illustrates a flowchart 700 that describes an ectopic tooth segmentation process for identifying an ectopic in spaces between teeth. Referring to step 702 of flowchart 700 the process includes performing a basic scan along a teeth curve to detect the widths of each tooth in the patient's arch and also to detect the distances or gaps between adjacent teeth in the patient's arch. This scan can be performed, for example, with an intraoral scanner.

Next, at step 704, the process includes identifying gaps or distances between adjacent teeth that are greater than an ectopic tooth threshold. For example, an ectopic tooth threshold can be defined as a gap or distance between adjacent tooth that is greater than ½ of an average tooth width. In other non-limiting examples, the ectopic tooth threshold can be greater than ¼ of an average tooth width, or even greater than ¾ of an average tooth width. An average tooth width can be defined as an average width for a tooth that is expected to be positioned in the location of the gap. For example, referring to FIG. 5, the gap is positioned next to the lateral incisor 7. A tooth segmentation process would expect to find a canine 6 adjacent to the lateral incisor 7. However, in this instance, a gap is located next to the lateral incisor 7. So for this example, the average tooth width would be the average width of an adult canine on the upper arch.

Next, at step 706, if a gap distance is identified that is greater than the ectopic tooth threshold, the process can scan above the gap for an upper arch or below the gap for a lower arch to identify an ectopic tooth. Referring back to the FIG. 5 example, the ectopic tooth segmentation process would scan above the gap between teeth 5 and 7 if the gap is larger than the average width of an adult canine. Shifting the plane of scan to be above the gap (and therefore above the teeth curve) would identify ectopic tooth 6 in FIG. 5.

Finally, at step 708, the process includes re-numbering the teeth based on the ectopic scan of step 706. Referring back to FIG. 5, an ectopic scan above the gap between teeth 5 and 7 would identify ectopic tooth 6. In this example, the teeth can be re-numbered to account for the ectopic tooth.

Detecting Ectopics in Teeth Numeration

Figure 8:
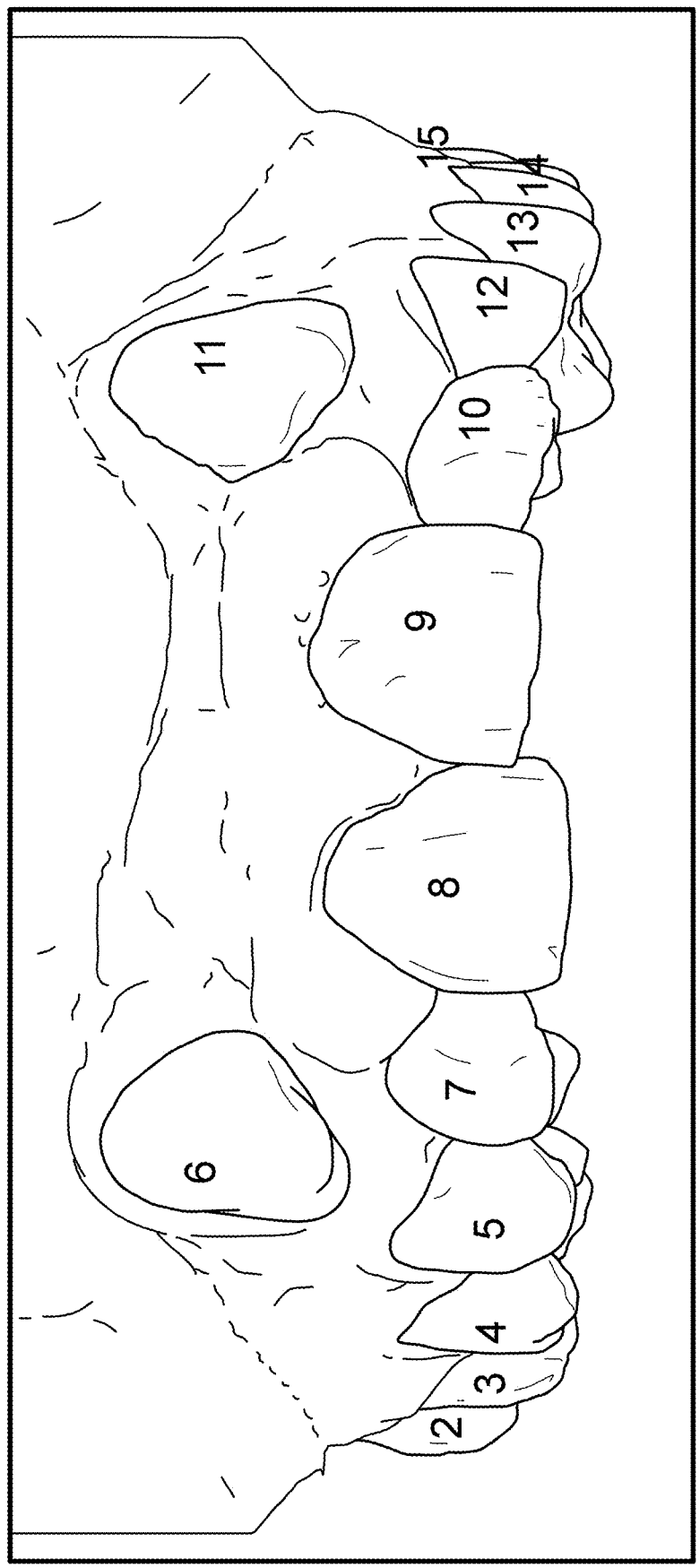
FIG. 8 illustrates an example of an ectopic tooth in a patient's arch in which there is not a large gap or distance between teeth.

As described above, a basic tooth segmentation process that scans along the teeth curve will fail to identify ectopic teeth that are significantly above or below the teeth curve. The process described in FIG. 7 identifies gaps as a way to know when to look for ectopic teeth. However, there are also scenarios where a patient's arch may have ectopic teeth, but no gaps in the arch. Referring to FIG. 8, the patient's arch includes ectopic teeth 6 and 11. Unlike the previous examples, however, there are no gaps below the ectopic teeth (or above in the case of a lower arch) to use as a starting point to look for ectopics. In the example of FIG. 8, a scan along the teeth curve would fail to identify canines 6 and 11, and could result in the first bicuspid being improperly numbered as tooth 6, the second bicuspid being improperly numbered as tooth 5, the first molar being improperly numbered as tooth 4, and so forth.

FIG. 9 is a diagram showing an example of automated ectopic detecting engine(s) 901. The automated ectopic detecting engine(s) 901 may include ectopic tooth identification engine 905, a tooth width analysis engine 910, a tooth type datastore 915, a teeth re-numbering engine 920, and a re-numbered arch datastore 925. One or more of the modules of the automated ectopic detecting engine(s) 901 may be coupled to one another.

The ectopic tooth identification engine 905 may implement one or more automated agents configured to identify one or more ectopic teeth. In some implementations, the ectopic tooth identification engine 905 receives anatomical tooth identifiers of missing or ectopic teeth through manual input or through an automated system. In an implementation, the ectopic tooth identification engine 905 may receive tooth numbers and/or character strings input by a medical professional corresponding to a missing or ectopic tooth of a patient. In various implementations, the ectopic tooth identification engine 905 may receive the results of a scan (e.g., an optical scan) or a virtual representation of a dental mold that identifies missing or ectopic teeth. The ectopic tooth identification engine 905 may provide identifiers or dimensions of gaps between teeth to other modules, such as the tooth width analysis engine 910 or the ectopic scanning engine 915. In some implementations, this may involve the ectopic tooth identification engine 905 providing gap dimension or distance data between adjacent teeth. This can be performed in other ways as well.

The tooth width analysis engine 910 may implement one or more automated agents configured to identify missing or ectopic teeth based on tooth dimensions. In some implementations, the tooth width analysis engine 910 receives identifiers or dimensions of teeth dimensions, including buccal-lingual width and/or mesial-distal width, and evaluates/compares the widths to determine a tooth type. For example, the tooth width analysis engine 610 can evaluate the relationship between the mesial-distal width and the buccal-lingual width to determine the tooth type. In one example, the tooth width analysis engine 910 can evaluate the relationship between the mesial-distal width of a tooth and the buccal-lingual width of a tooth to determine if the tooth is a molar or upper bicuspid. In another example, the mesial-distal width of a tooth can be compared to a first threshold, the buccal-lingual width of the tooth can be compared to a second threshold, and the ratio between the two widths can be compared to a third threshold to determine if the tooth is a molar or a lower bicuspid. In yet another example, the relationship between the mesial-distal widths of adjacent teeth can be evaluated and compared to a threshold to determine if the adjacent teeth are a molar/bicuspid pair. The tooth type datastore 915 can be configured to store identifiers of the tooth types identified by the tooth width analysis engine 910.

The teeth re-numbering engine 920 may implement one or more automated agents configured to re-number the teeth in a patient's arch while accounting for ectopic teeth. In some implementations, the teeth re-numbering engine 920 receives identifiers of the location of teeth types from tooth type datastore 915. The teeth re-numbering engine 920 can be configured to re-number the teeth of the patient's arch by accounting for the teeth types identified by the tooth width analysis engine 910. The teeth re-numbering engine 920 can be configured to store identifiers of the final re-numbered arch in re-numbered arch datastore 925.

Figure 10:
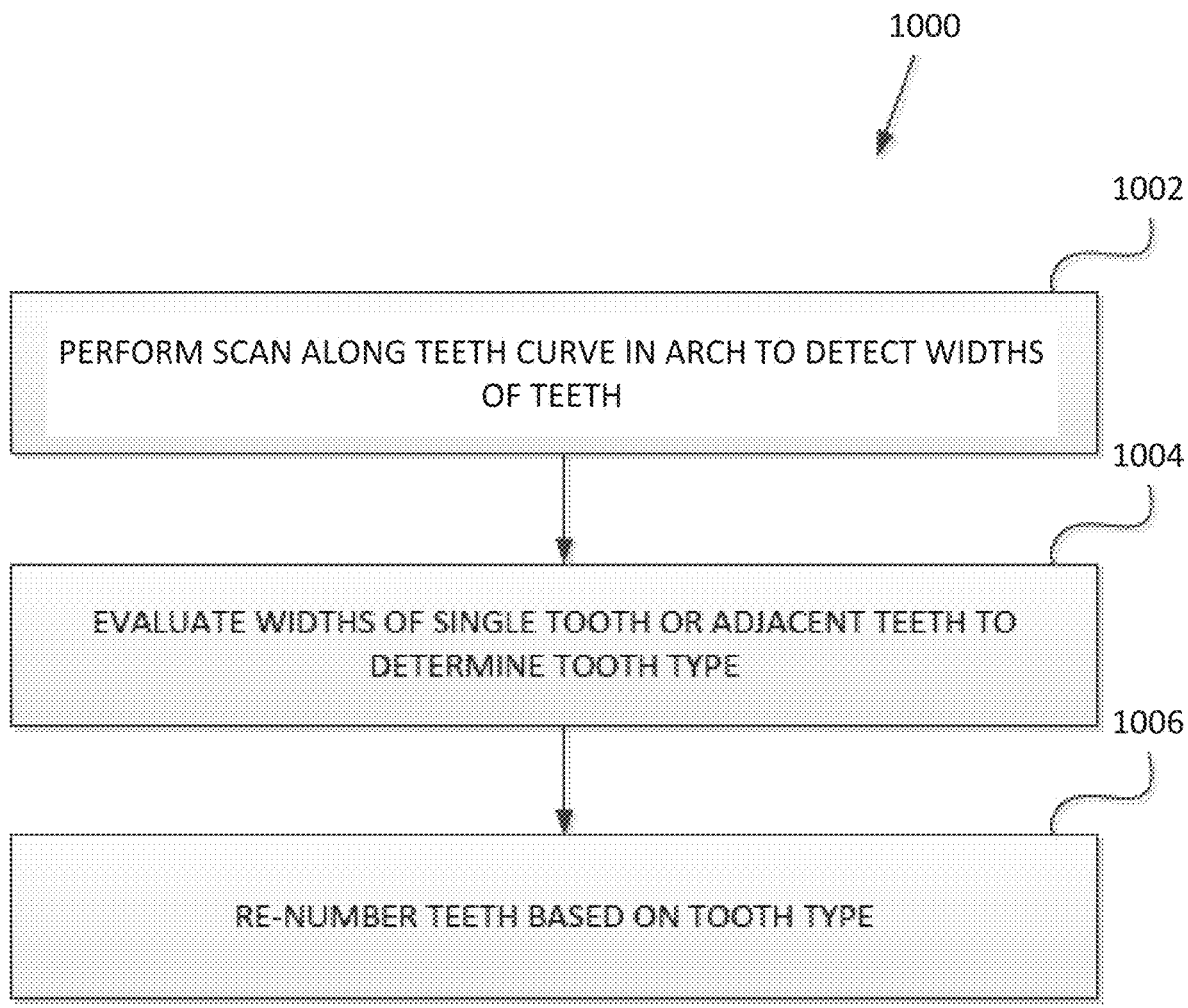
FIG. 10 is a flowchart describing an example of a process for re-numbering teeth in the presence of an ectopic tooth that is not near a large gap or distance between teeth.

FIG. 10 illustrates a flowchart 1000 that describes an ectopic tooth segmentation process for identifying an ectopic in a patient's arch that are not positioned near a gap or space between adjacent teeth. Referring to step 1002 of flowchart 1000 the process includes performing a basic scan along a teeth curve to detect the widths of each tooth in the patient's arch. This scan can be performed, for example, with an intraoral scanner. The detected widths can include mesial-distal widths and buccal-lingual widths.

Next, at step 1004, the process includes evaluating widths of a single tooth, or of adjacent teeth, to determine the tooth type or types. This evaluation depends on the tooth or teeth being analyzed, and specific methods depending on the tooth/teeth being analyzed will be described in more detail below.

Finally, at step 1006, the process includes re-numbering the teeth based on the evaluation of step 1004. In this example, the teeth can be re-numbered to account for the ectopic tooth even in the absence of a gap between adjacent teeth.

Molar or Upper Bicuspid

The relationship between the mesial-distal width of a tooth and the buccal-lingual width of a tooth can be evaluated to determine if a tooth is a molar or upper bicuspid. For example, referring to FIG. 8, if the ectopic canine 6 is not detected, the first molar 3 could be improperly numbered as bicuspid 4.

Figure 11:
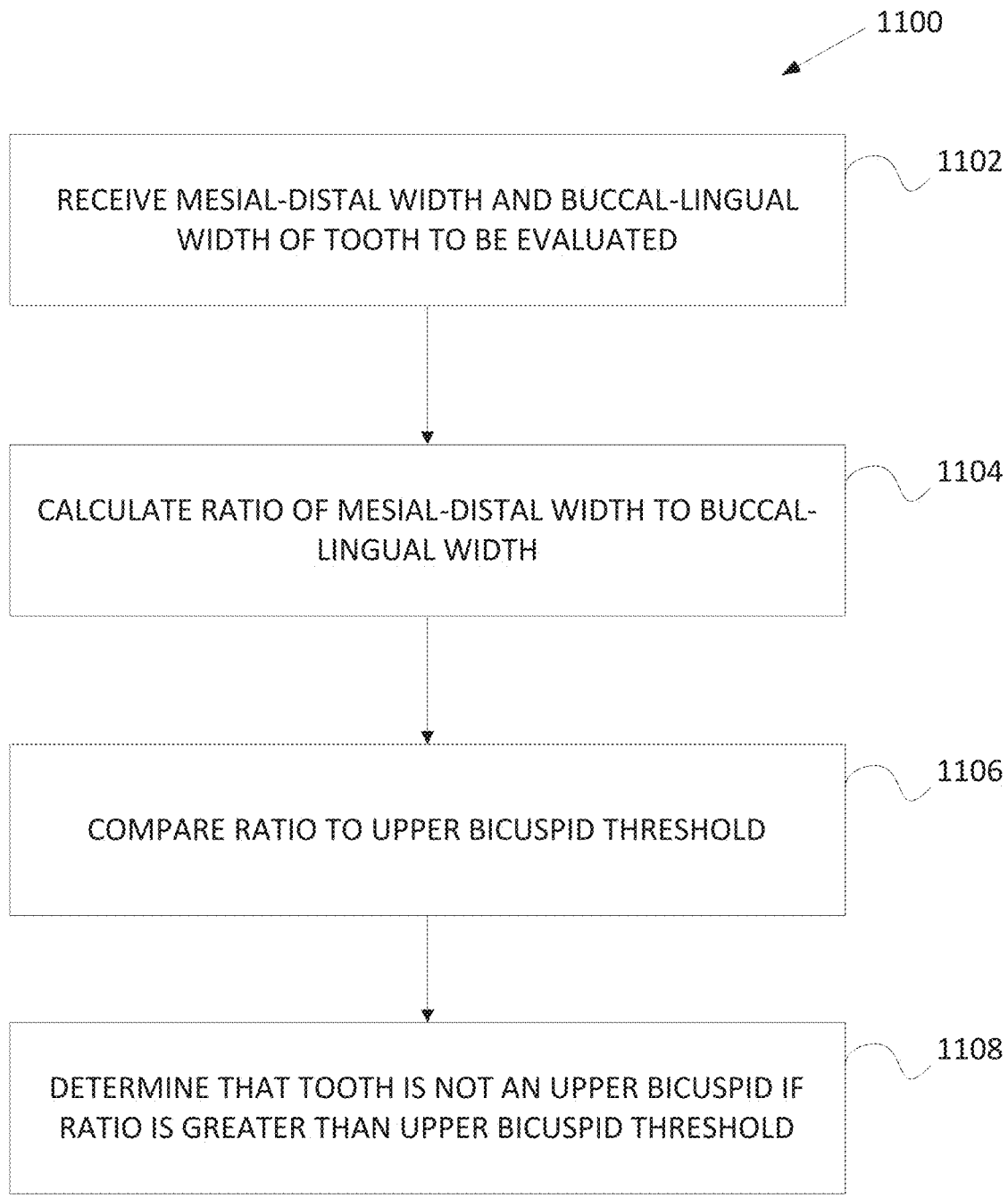
FIG. 11 is a flowchart describing an example of a process for determining if a tooth is a molar or an upper bicuspid.

FIG. 11 is a flowchart 1100 showing an example of a method of determining if a tooth is a molar or an upper bicuspid. At step 1102 of the flowchart, the mesial-distal width and the buccal-lingual width of the tooth to be evaluated can be received, such as from a scan of the patient's arch. Next, at step 1104 of the flowchart, the ratio between the mesial-distal width and the buccal-lingual width of the tooth can be calculated. At step 1106 of the flowchart, the ratio between the mesial-distal width and the buccal-lingual width can be compared to an upper bicuspid threshold. Finally, at step 1108 of the flowchart, if this ratio is greater than an upper bicuspid threshold, then it can be determined that the tooth is not an upper bicuspid. In one non-limiting example, an upper bicuspid threshold is 0.83. Thus, a ratio between the mesial-distal width and the buccal-lingual width of first molar 3 in FIG. 8 that is greater than the upper bicuspid threshold (e.g., 0.83) indicates that the first molar 3 is not a bicuspid.

Molar or Lower Bicuspid

Figure 12:
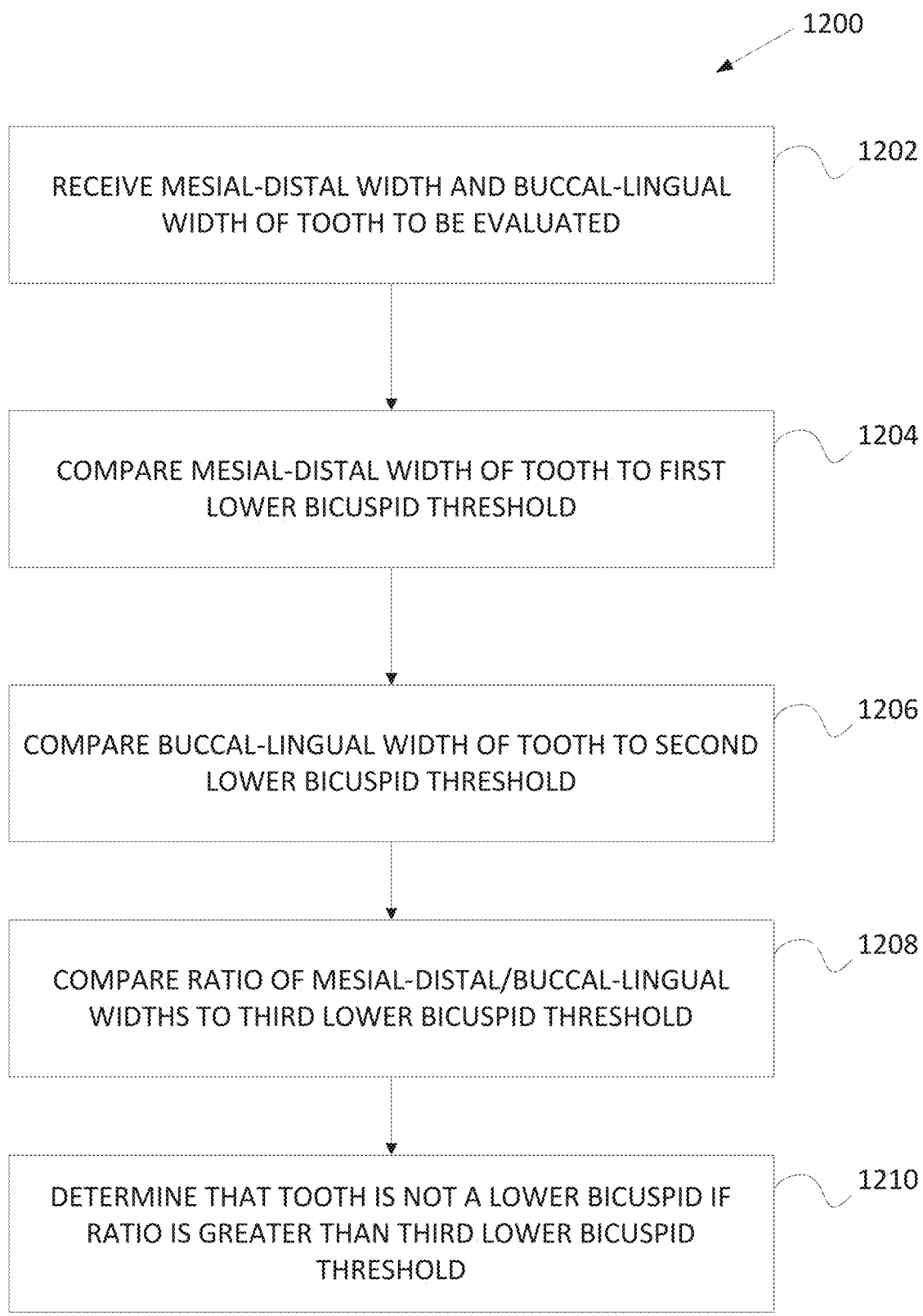
FIG. 12 is a flowchart describing an example of a process for determining if a tooth is a molar or a lower bicuspid.

FIG. 12 is a flowchart 1200 showing an example of a method of determining if a tooth is a molar or a lower bicuspid. At step 1202 of the flowchart, the mesial-distal width and the buccal-lingual width of the tooth to be evaluated can be received, such as from a scan of the patient's arch. At step 1204 of the flowchart, the mesial-distal width of the tooth can be compared to a first lower bicuspid threshold. In one non-limiting example, the first lower bicuspid threshold can be 7.3 mm. If the mesial-distal width is greater than the first lower bicuspid threshold, then at step 1206 the buccal-lingual width of the tooth can be compared to a second lower bicuspid threshold. In one non-limiting example, the second lower bicuspid threshold can be 8.0 mm. If the buccal-lingual width is greater than the second lower bicuspid threshold, then at step 1208 the ratio between the mesial-distal width and the buccal-lingual width can be compared to a third lower bicuspid threshold. In one non-limiting example, the third lower bicuspid threshold is 0.93. At step 1210 of the flowchart, if the calculated ratio is greater than the third lower bicuspid threshold, then the tooth is not a bicuspid and is the first molar.

Molar Next to Bicuspid

The relationship between the mesial-distal widths of adjacent teeth can be evaluated to determine if a tooth is a molar/bicuspid pair. For example, referring to FIG. 8, if the ectopic canine 6 is not detected, the first molar 3 could be improperly numbered as tooth 4.

Figure 13:
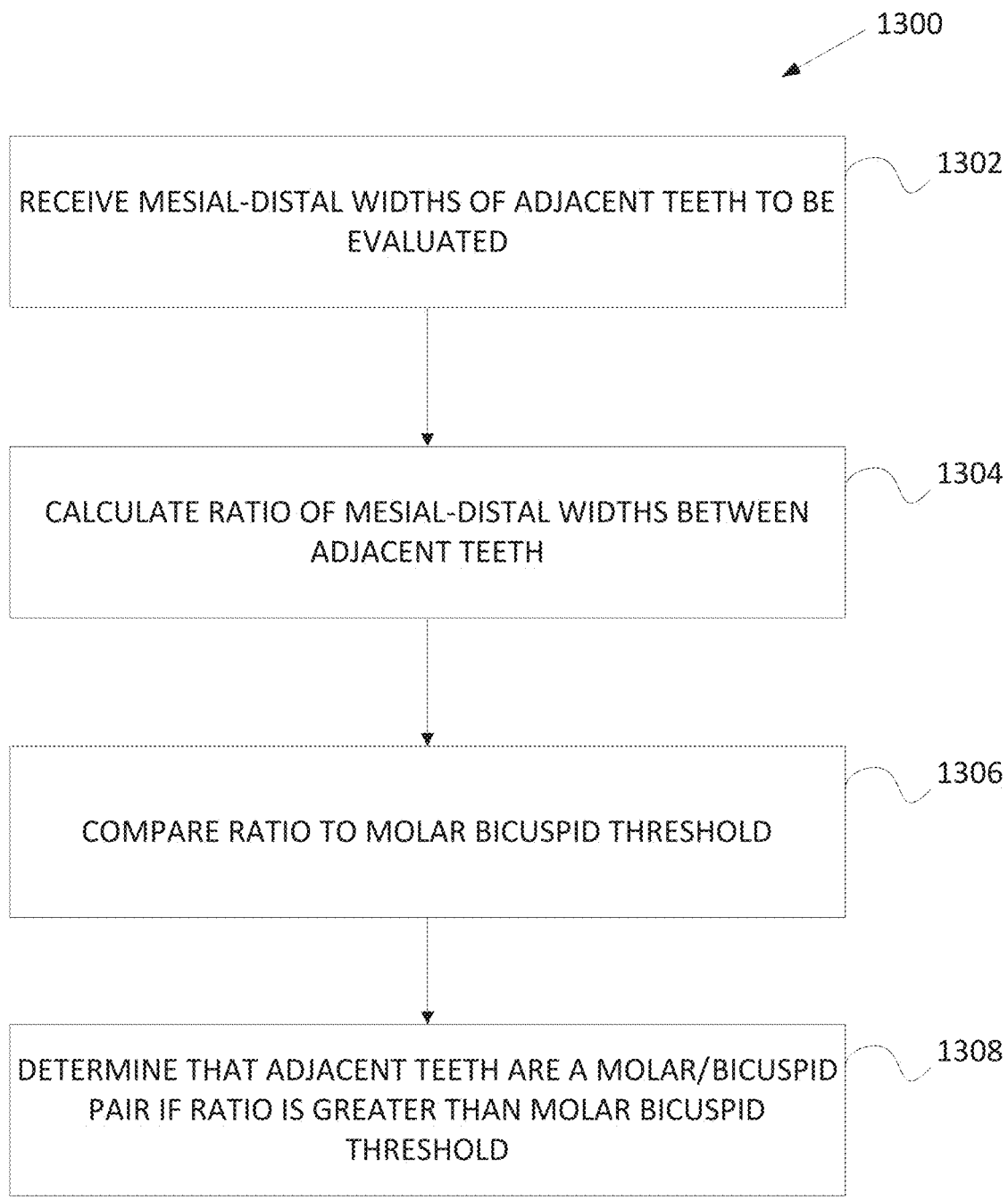
FIG. 13 is a flowchart describing an example of a process for determining if adjacent teeth are a molar bicuspid pair.

FIG. 13 is a flowchart 1300 showing an example of a method of determining if adjacent teeth are a molar/bicuspid pair. At step 1302 of the flowchart, the mesial-distal widths of adjacent teeth to be evaluated can be received, such as from a scan of the patient's arch. At step 1304 of the flowchart, the ratio between the mesial-distal width of the adjacent teeth can be calculated. At step 1306, the ratio is compared to a molar bicuspid threshold. If this ratio is greater than a molar bicuspid threshold, then at step 1308 it can be determined that the adjacent teeth are a molar/bicuspid pair. In one non-limiting example, a molar bicuspid threshold is 1.3. Thus, referring to FIG. 8, a ratio between the mesial-distal widths a of first molar 3 and second bicuspid 4 that is greater than the molar bicuspid threshold (e.g., 1.3) indicates that tooth 3 is a molar and tooth 4 is a bicuspid.

The ratio between the mesial-distal widths of adjacent teeth can also be evaluated to determine if adjacent teeth are of the same type. If the ratio is approximately 1, then the adjacent teeth are of the same type. For example, referring to FIG. 8, the ratio between the mesial-distal width of tooth 2 and mesial-distal width of tooth 3 can be calculated. If this ratio is approximately 1, then the teeth are of the same type. Thus, a ratio between the mesial-distal widths a of second molar 2 and first molar 3 in FIG. 8 that is approximately 1 indicates that tooth 2 and tooth 3 are both molars.

Figure 14:
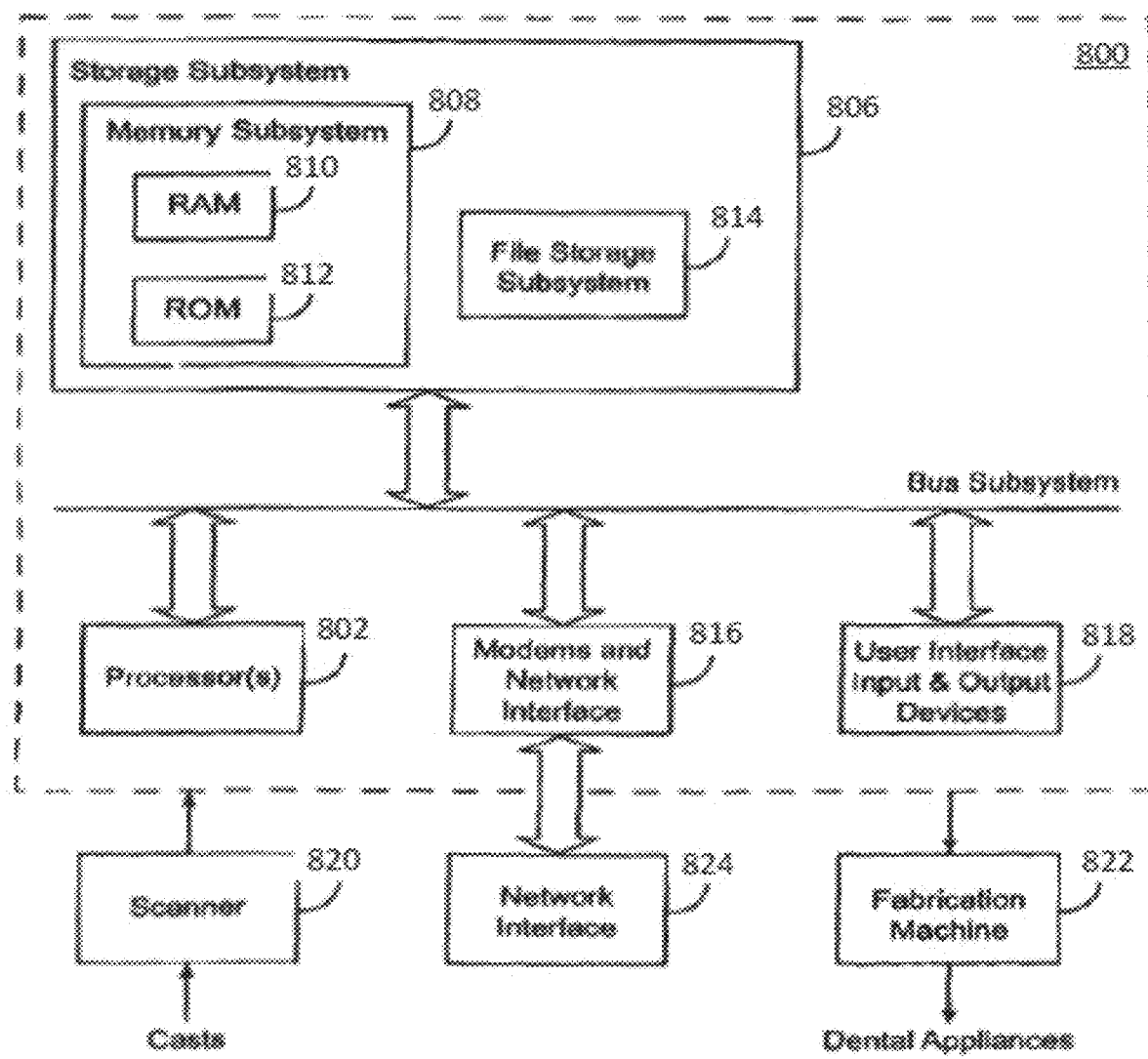
FIG. 14 is a simplified block diagram showing an example of a data processing system for designing and manufacturing an orthodontic aligner.

The methods described herein may be performed by an apparatus, such as a data processing system, which may include hardware, software, and/or firmware for performing many of these steps described above. For example, FIG. 14 is a simplified block diagram of a data processing system 800. Data processing system 800 typically includes at least one processor 802 which communicates with a number of peripheral devices over bus subsystem 804. These peripheral devices typically include a storage subsystem 806 (memory subsystem 808 and file storage subsystem 814), a set of user interface input and output devices 818, and an interface to outside networks 816, including the public switched telephone network. This interface is shown schematically as "Modems and Network Interface" block 816, and is coupled to corresponding interface devices in other data processing systems over communication network interface 824. Data processing system 800 may include a terminal or a low-end personal computer or a high-end personal computer, workstation or mainframe.

The user interface input devices typically include a keyboard and may further include a pointing device and a scanner. The pointing device may be an indirect pointing device such as a mouse, trackball, touchpad, or graphics tablet, or a direct pointing device such as a touchscreen incorporated into the display. Other types of user interface input devices, such as voice recognition systems, may be used.

User interface output devices may include a printer and a display subsystem, which includes a display controller and a display device coupled to the controller. The display device may be a cathode ray tube (CRT), a flat-panel device such as a liquid crystal display (LCD), or a projection device. The display subsystem may also provide nonvisual display such as audio output.

Storage subsystem 806 maintains the basic programming and data constructs that provide the functionality of the present invention. The software modules discussed above are typically stored in storage subsystem 806. Storage subsystem 806 typically comprises memory subsystem 808 and file storage subsystem 814.

Memory subsystem 808 typically includes a number of memories including a main random access memory (RAM) 810 for storage of instructions and data during program execution and a read only memory (ROM) 812 in which fixed instructions are stored. In the case of Macintosh-compatible personal computers the ROM would include portions of the operating system; in the case of IBM-compatible personal computers, this would include the BIOS (basic input/output system).

File storage subsystem 814 provides persistent (nonvolatile) storage for program and data files, and typically includes at least one hard disk drive and at least one floppy disk drive (with associated removable media). There may also be other devices such as a CD-ROM drive and optical drives (all with their associated removable media). Additionally, the system may include drives of the type with removable media cartridges. The removable media cartridges may, for example be hard disk cartridges, such as those marketed by Syquest and others, and flexible disk cartridges, such as those marketed by Iomega. One or more of the drives may be located at a remote location, such as in a server on a local area network or at a site on the Internet's World Wide Web.

In this context, the term "bus subsystem" is used generically so as to include any mechanism for letting the various components and subsystems communicate with each other as intended. With the exception of the input devices and the display, the other components need not be at the same physical location. Thus, for example, portions of the file storage system could be connected over various local-area or wide-area network media, including telephone lines. Similarly, the input devices and display need not be at the same location as the processor, although it is anticipated that the present invention will most often be implemented in the context of PCS and workstations.

Bus subsystem 804 is shown schematically as a single bus, but a typical system has a number of buses such as a local bus and one or more expansion buses (e.g., ADB, SCSI, ISA, EISA, MCA, NuBus, or PCI), as well as serial and parallel ports. Network connections are usually established through a device such as a network adapter on one of these expansion buses or a modem on a serial port. The client computer may be a desktop system or a portable system.

Scanner 820 is responsible for scanning casts of the patient's teeth obtained either from the patient or from an orthodontist and providing the scanned digital data set information to data processing system 800 for further processing. In a distributed environment, scanner 820 may be located at a remote location and communicate scanned digital data set information to data processing system 800 over network interface 824.

Fabrication machine 822 fabricates dental appliances based on intermediate and final data set information received from data processing system 800. In a distributed environment, fabrication machine 822 may be located at a remote location and receive data set information from data processing system 800 over network interface 824.

The dental appliance fabricated by the fabrication machine 822 can be designed to implement at least a portion of a treatment plan, comprising a shell having a plurality of cavities therein designed to receive teeth of a jaw.

In another embodiment, the system 800 of FIG. 14 can include a non-transitory computing device readable medium having instructions stored thereon that are executable by a processor to cause a computing device to receive, via a computing device, data representing a plurality of teeth and generate a series of incremental tooth arrangements to define a proposed orthodontic treatment.

Various alternatives, modifications, and equivalents may be used in lieu of the above components. Although the final position of the teeth may be determined using computer-aided techniques, a user may move the teeth into their final positions by independently manipulating one or more teeth while satisfying the constraints of the prescription.

Additionally, the techniques described here may be implemented in hardware or software, or a combination of the two. The techniques may be implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices.

Each program can be implemented in a high level procedural or object-oriented programming language to operate in conjunction with a computer system. However, the programs can be implemented in assembly or machine language, if desired. In any case, the language may be a compiled or interpreted language.

Each such computer program can be stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Figure 15:
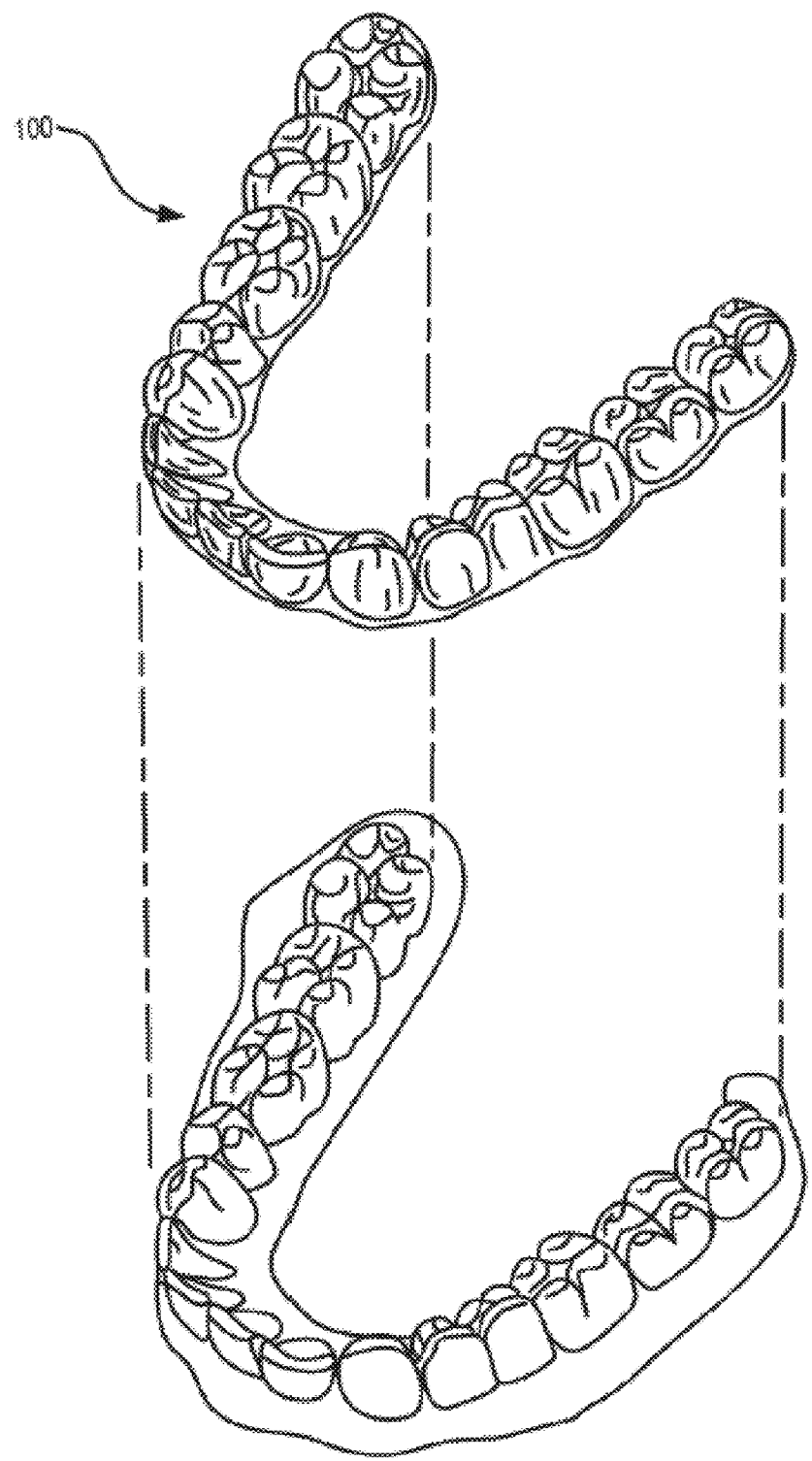
FIG. 15 shows an example of an orthodontic aligner.

FIG. 15 shows an orthodontic aligner 100, which can be designed and manufactured by the system described above.

Figure 16:
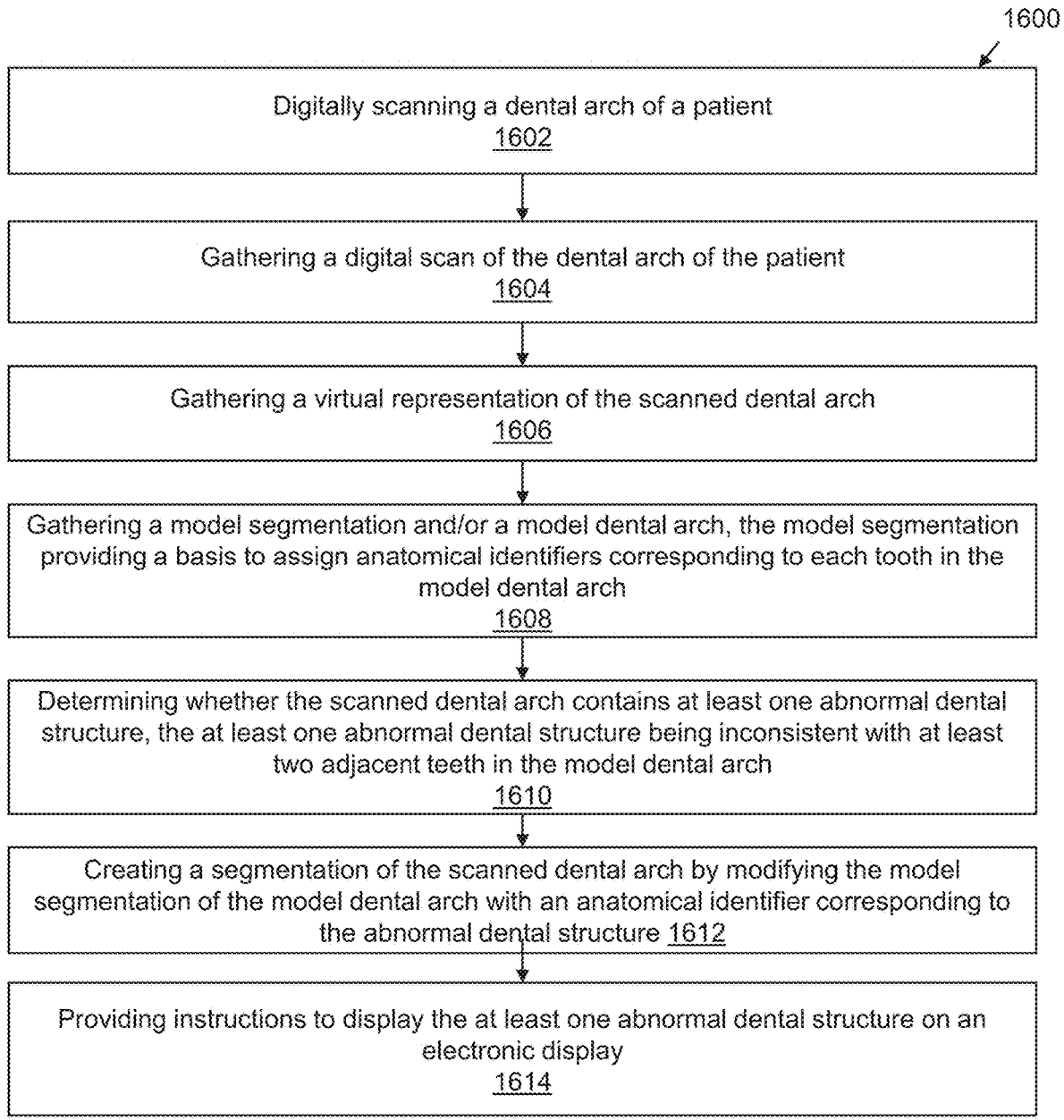
FIG. 16 is a flowchart of an example process for accurately segmenting a scanned dental arch with abnormal dental structures.

FIG. 16 is a flowchart 1600 of an example process for accurately segmenting a scanned dental arch with abnormal dental structures. The flowchart 1600 is discussed in conjunction with the structures of the computing environment 300A and/or the scan processing system 358 shown in the FIGS. and described further herein. It is noted other structures may implement the operations of the flowchart 1600, and that processes illustrated in the flowchart 1600 may involve a greater or lesser number of operations than those depicted in FIG. 16.

At an operation 1602, a dental arch of the patient may be digitally scanned. The scan may comprise an optical (e.g., digital and/or intraoral scan) of the dental arch. The scan may comprise one or more images of physical bite impressions of the dental arch. In various implementations, the scan may be taken at a stage (e.g., a preliminary or intermediate stage) of an orthodontic treatment plan. The scan may be a scan by a dedicated intraoral scanner, such as one having a display configured thereon. In some implementations, the scanning system 354 may gather a digital scan of a dental arch of a patient. At an operation 1604, the digital scan of a dental arch of a patient may be gathered and/or processed. A digital file corresponding to the digital scan of the dental arch may be gathered from a datastore. The digital scan may also be streamed to a relevant device. In an implementation, the arch scanning engine 372 may gather and/or process the digital scan of the dental arch of the patient.

At an operation 1606, a virtual representation of the scanned dental arch may be gathered. The scanned dental arch of the patient may be transformed from a 2D representation and/or image to a 3D virtual representation having each tooth of the arch modeled as a virtual 3D object. The 3D virtual representation may have modeled thereon objects that correspond to each tooth and/or other structure on the scanned dental arch. In some implementations, the arch scanning engine 372 may gather a virtual representation of the scanned dental arch from the segmented arch datastore.

At an operation 1608, a model segmentation and/or a model dental arch may be gathered. As noted herein, the model dental arch may provide a basis to infer relationships and/or geometries of human teeth. The model segmentation may provide a basis to assign anatomical identifiers corresponding to each tooth in the model dental arch. As noted herein, the arch scanning engine 372 may gather a model dental arch from the segmented arch datastore 382. The arch scanning engine 372 may also gather and/or identify a model segmentation for the model arch.

At an operation 1610, it may be determined whether or not the scanned dental arch contains at least one abnormal dental structure. The at least one abnormal dental structure may but need not be inconsistent with at least two adjacent teeth in the model dental arch. One example of an abnormal dental structure is a spatial gap that exceeds a specified gap threshold. Another example of an abnormal dental structure is the existence of two adjacent teeth that are not adjacent to one another in a model dental arch. As noted herein, the tooth gap analysis engine 374 and/or the adjacent tooth analysis engine 376 may determine whether or not the scanned dental arch contains at least one abnormal dental structure. These engines may provide identifiers of abnormal dental structures to other modules, such as the ectopic tooth detection engine 378 and the tooth re-segmentation engine 380.

At an operation 1612, a segmentation of the scanned dental arch may be created by modifying the model segmentation of the model dental arch with an anatomical identifier corresponding to the abnormal dental structure. As noted herein, the scanned dental arch may be segmented from a first point (e.g., the anterior midline of the dental arch) to one or more second points (posterior portions). Identifiers of abnormal dental structures may be used to modify model segmentation associated with the model dental arch, as noted further herein. The tooth re-segmentation engine 380 may create a segmentation of the scanned dental arch by modifying the model segmentation of the model dental arch with an anatomical identifier corresponding to the abnormal dental structure. The tooth re-segmentation engine 380 may further store a re-segmented arch, corresponding to the scanned dental arch, in the re-segmented arch datastore 386.

At an operation 1614, instructions to display the at least one abnormal dental structure on an electronic display may be provided. As noted herein, the dentition display system 356 may provide instructions to display the at least one abnormal dental structure.

Figure 17:
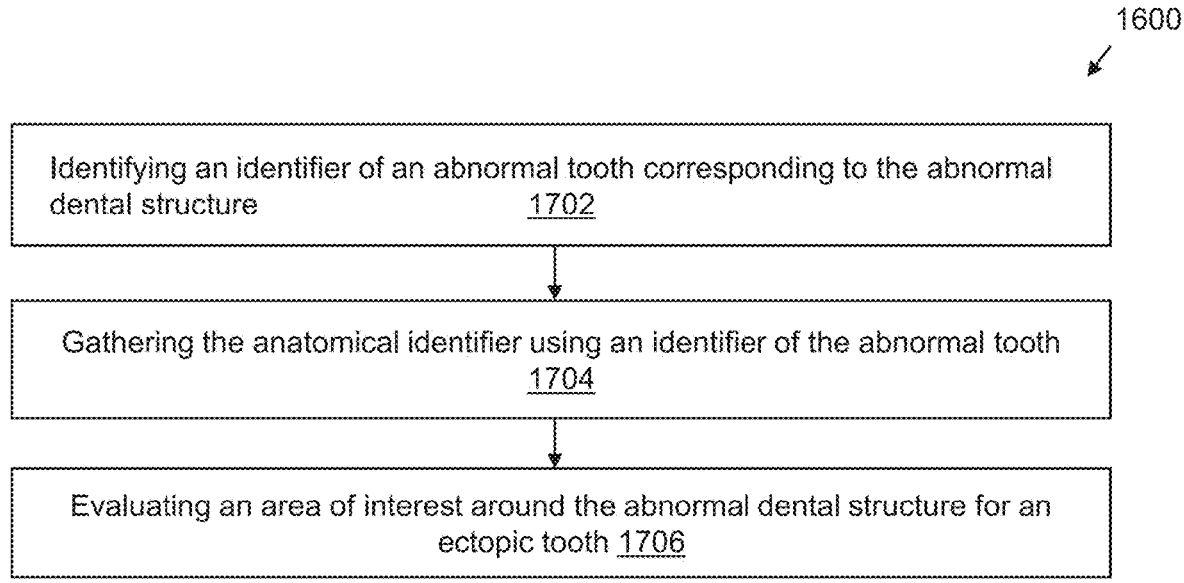
FIG. 17 is a flowchart of an example process for identifying an ectopic tooth outside a scanned dental ach.

FIG. 17 is a flowchart of an example process for identifying an ectopic tooth outside a scanned dental ach. The flowchart 1700 is discussed in conjunction with the structures of the computing environment 300A and/or the scan processing system 358 shown in the FIGS. and described further herein. It is noted other structures may implement the operations of the flowchart 1700, and that processes illustrated in the flowchart 1700 may involve a greater or lesser number of operations than those depicted in FIG. 17.

At an operation 1702, an identifier of an abnormal tooth corresponding to an abnormal dental structure may be identified. As noted herein, the abnormal dental structure may correspond to an area of a scanned dental arch where two teeth that are not normally adjacent are either adjacent or are separated by a gap. In some implementations, the identity of an abnormal tooth that resides between the two teeth in a model dental arch may be inferred from the fact that the two teeth are adjacent to one another or separated by a gap in the scanned dental arch. As an example, the tooth gap analysis engine 374 and/or the adjacent tooth analysis engine 376 may provide the ectopic tooth detection engine 378 with an identifier of an ectopic tooth based on the fact that two normally non-adjacent teeth are either adjacent to each other or are separated by a gap in the scanned dental arch. At an operation 1704, the anatomical identifier may be gathered using an identifier of the abnormal tooth. The ectopic tooth detection engine 378 may gather an anatomical identifier using an identifier of the abnormal tooth.

At an operation 1706, an area of interest around the abnormal dental structure may be evaluated for an ectopic tooth. In some implementations, the scanned dental arch may be evaluated for whether it is a lower or upper dental arch by, e.g., the arch identification engine 388. The object scanning engine 390 may scan in a specified direction (e.g., a transverse direction) for objects that are likely to correspond to ectopic teeth. The tooth shape matching engine 392 may compare any discovered objects with tooth shapes of model teeth. The tooth shape matching engine 392 may provide a notification about whether or not discovered objects correspond to ectopic teeth.

Figure 18:
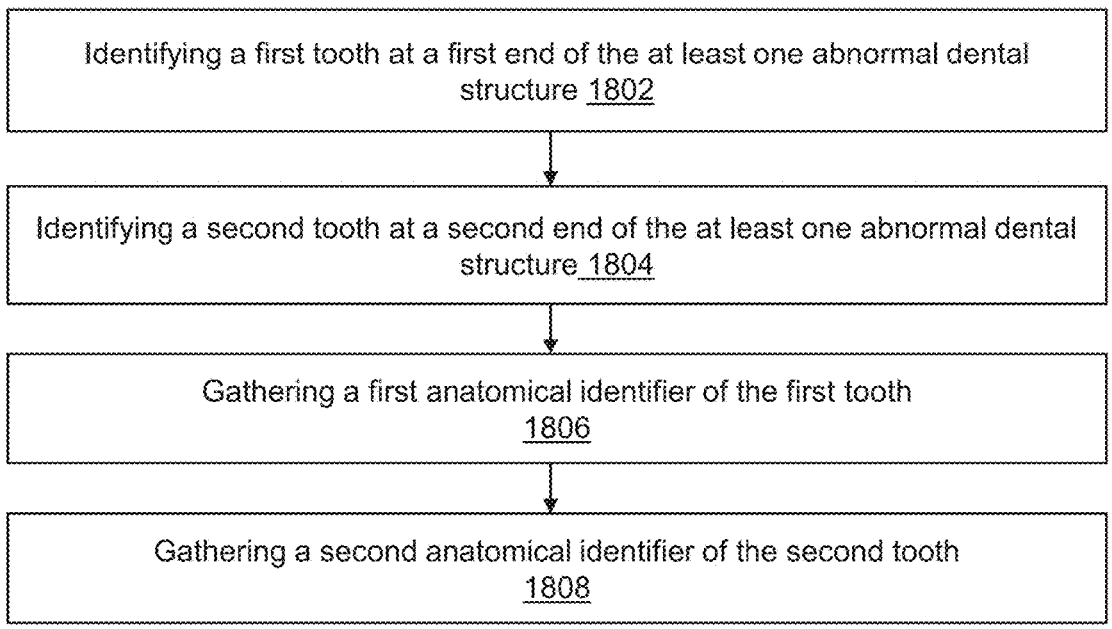
FIG. 18 is a flowchart of an example process for identifying an abnormal dental structure.

FIG. 18 is a flowchart of an example process for identifying an abnormal dental structure. The flowchart 1800 is discussed in conjunction with the structures of the computing environment 300A and/or the scan processing system 358 shown in the FIGS. and described further herein. It is noted other structures may implement the operations of the flowchart 1800, and that processes illustrated in the flowchart 1800 may involve a greater or lesser number of operations than those depicted in FIG. 18.

At an operation 1802, a first tooth at a first end of the at least one abnormal dental structure may be identified. At an operation 1804, a second tooth at a second end of the at least one abnormal dental structure may be identified. At an operation 1806, a first anatomical identifier of the first tooth may be gathered. At an operation 1808, a second anatomical identifier of the second tooth may be gathered. In various implementations, the tooth gap analysis engine 374 and/or the adjacent tooth analysis engine 376 may perform the operations 1802, 1804, 1806, and 1808.

While preferred embodiments of the present disclosure have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for numbering a patient's teeth to account for an abnormal tooth, comprising:
   receiving, in a processor, a dental scan along a teeth curve of a patient's dental arch;
   numbering, in the processor, each of the patient's teeth to a first numbering value, wherein the first numbering value corresponds to an expected tooth type;
   detecting dimensions of each of the patient's teeth;
   evaluating, in the processor, a width of a target tooth or widths of adjacent target teeth to determine a tooth type or teeth types;
   determining a presence of a missing or ectopic tooth by determining that the first numbering value of the target tooth or adjacent target teeth does not match the determined tooth type or teeth types; and
   re-numbering the patient's teeth to account for the presence of the missing or ectopic tooth.

2. The method of claim 1, further comprising creating a segmentation of a virtual representation of the patient's dental arch by modifying a model segmentation of the virtual representation of the patient's dental arch with an anatomical identifier corresponding to the abnormal tooth.

3. The method of claim 1, further comprising:
   determining an orthodontic treatment plan to reposition at least one of the patient's teeth based on the re-numbered patient's teeth; and
   creating one or more dental appliances based on the orthodontic treatment plan.

4. The method of claim 1, wherein the dimensions comprise a mesial-distal width or a buccal-lingual width of each tooth of the patient's dental arch.

5. The method of claim 1, wherein the evaluating step further comprises:
   calculating a ratio between a mesial-distal width of the target tooth to a buccal-lingual width of the target tooth;
   determining that the target tooth is not an upper bicuspid if the ratio exceeds an upper bicuspid threshold.

6. The method of claim 5, wherein the upper bicuspid threshold is 0.83.

7. The method of claim 1, wherein the evaluating step further comprises:
   determining if a mesial-distal width of the target tooth is greater than a first lower bicuspid threshold and determining if a buccal-lingual width of the target tooth is greater than a second lower bicuspid threshold, and calculating a ratio between the mesial-distal width of the target tooth to the buccal-lingual width of the target tooth;
   determining that the target tooth is not a lower bicuspid if the ratio exceeds a third lower bicuspid threshold.

8. The method of claim 7, wherein the first lower bicuspid threshold is 7.3 mm.

9. The method of claim 7, wherein the second lower bicuspid threshold is 8.0 mm.

10. The method of claim 7, wherein the third lower bicuspid threshold is 0.93.

11. The method of claim 1, wherein the evaluating step further comprises:
    calculating a ratio between mesial-distal widths of adjacent teeth;

determining that the adjacent teeth are a molar/bicuspid pair if the ratio exceeds a molar bicuspid threshold.

12. The method of claim 11, wherein the molar bicuspid threshold is at least 1.3.

13. The method of claim 12, wherein the evaluating step further comprises:
   determining that the adjacent teeth are a molar/molar pair or a bicuspid/bicuspid pair if the ratio is approximately 1.

14. The method of claim 1, further comprising determining that the abnormal tooth is an ectopic tooth.

15. The method of claim 1, further comprising determining that the abnormal tooth is an unerupted tooth.

16. A computer-implemented method, comprising:
   gathering a virtual representation of a patient's dental arch;
   gathering a model segmentation of the virtual representation of the patient's dental arch, the model segmentation providing a basis to assign anatomical identifiers corresponding to each tooth in the virtual representation of the patient's dental arch;
   numbering each of the patient's teeth of the patient's dental arch to a first numbering value, wherein the first numbering value corresponds to an expected tooth type;
   detecting dimensions of each of the patient's teeth;
   evaluating a width of a target tooth or widths of adjacent target teeth to determine a tooth type or teeth types;
   determining a presence of a missing or ectopic tooth by determining that the first numbering value of the target tooth or adjacent target teeth does not match the determined tooth type or teeth types;
   re-numbering the patient's teeth to account for the presence of the missing or ectopic tooth; and
   creating a segmentation of the virtual representation of the patient's dental arch by modifying the model segmentation of the virtual representation of the patient's dental arch with an anatomical identifier corresponding to the missing or ectopic tooth.

17. The method of claim 16, wherein gathering the virtual representation of a patient's dental arch comprises receiving a dental scan along a teeth curve of the patient's dental arch.

18. A system comprising:
   one or more processors;
   memory coupled to the one or more processors, the memory configured to store computer-program instructions that, when executed by the processor, cause the processor to execute a computer-implemented method, the computer-implemented method comprising:
      receiving, in a processor, a dental scan along a teeth curve of a patient's dental arch;
      numbering each of the patient's teeth of the patient's dental arch to a first numbering value, wherein the first numbering value corresponds to an expected tooth type;
      detecting dimensions of each of the patient's teeth;
      evaluating, in the processor, a width of a target tooth or widths of adjacent target teeth to determine a tooth type or teeth types;
      determining a presence of a missing or ectopic tooth by determining that the first numbering value of the target tooth or adjacent target teeth does not match the determined tooth type or teeth types; and
      re-numbering the patient's teeth to account for the presence of the missing or ectopic tooth.

19. The system of claim 18, further comprising creating a segmentation of a virtual representation of the patient's dental arch by modifying a model segmentation of the virtual representation of the patient's dental arch with an anatomical identifier corresponding to the missing or ectopic tooth.

20. The system of claim 18, wherein the evaluating step further comprises:
   calculating a ratio between a mesial-distal width of the target tooth to a buccal-lingual width of the target tooth; and
   determining that the target tooth is not an upper bicuspid if the ratio exceeds an upper bicuspid threshold.

21. The method of claim 1, wherein determining the presence of the missing or ectopic tooth further comprises identifying an area of the patient's dental arch where two teeth that are not normally adjacent are either adjacent or are separated by a gap.

22. The method of claim 1, wherein the patient's teeth are re-numbered based on an identifier of a location of the missing or ectopic tooth.

* * * * *